(12) United States Patent
Smartt

(10) Patent No.: US 7,035,869 B2
(45) Date of Patent: Apr. 25, 2006

(54) SYSTEM AND METHOD OF OPTIMIZING DATABASE QUERIES IN TWO OR MORE DIMENSIONS

(75) Inventor: Brian E. Smartt, Sunnyvale, CA (US)

(73) Assignee: Telcontar, San Jose, CA (US)

( * ) Notice: Subject to any disclaimer, the term of this patent is extended or adjusted under 35 U.S.C. 154(b) by 216 days.

(21) Appl. No.: 10/278,126

(22) Filed: Oct. 22, 2002

(65) Prior Publication Data

US 2003/0187867 A1    Oct. 2, 2003

Related U.S. Application Data

(60) Continuation of application No. 09/231,515, filed on Jan. 14, 1999, now Pat. No. 6,470,287, which is a division of application No. 08/807,471, filed on Feb. 27, 1997, now Pat. No. 5,963,956.

(51) Int. Cl.
*G06F 17/00* (2006.01)

(52) U.S. Cl. .................. 707/102; 707/4; 707/104.1

(58) Field of Classification Search .............. 707/1–10, 707/100–102, 200, 104.1
See application file for complete search history.

(56) References Cited

U.S. PATENT DOCUMENTS

| | | | |
|---|---|---|---|
| 5,353,391 A | 10/1994 | Cohen et al. | |
| 5,359,712 A | 10/1994 | Cohen et al. | |
| 5,546,572 A | 8/1996 | Seto et al. | |
| 5,548,700 A | 8/1996 | Bagley et al. | |
| 5,566,349 A | 10/1996 | Trout | |
| 5,568,200 A | 10/1996 | Pearlstein et al. | |

OTHER PUBLICATIONS

Brobowski et al., Oracle7 Server Concepts Manual, 1992, p. 1-27.*
US trends in navigable digital map databases; Shields, T.R.; Vehicle Navigation and Information Systems Conference, 1994. Proceedings., Aug. 31, 1994-Sep. 2, 1994 Page(s): 533-536.*
Map database generation system for in-vehicle navigation system; Ohnishi, H.; Ogawa, I.; Morisue, F.; Vehicle Navigation and Information Systems Conference, 1994. Proceedings., Aug. 31, 1994-Sep. 2, 1994 Page(s):607-612.*
IVHS map database transfer standards: current status;Pearlman, R.; Scott, S.; Vehicle Navigation and Information Systems Conference, 1995. Proceedings. In conjuction with the Pacific Rim TransTech Conference. 6th International VNIS.'A Ride into the Future.*

* cited by examiner

*Primary Examiner*—David Jung
(74) *Attorney, Agent, or Firm*—Knobbe, Martens, Olson & Bear, LLP

(57) ABSTRACT

A method and system for storing and retrieving spatial data objects from a spatial database is discussed. The system stores multi-dimensional objects within the database by determining their position in a multi-tiered coordinate system. One each object has been assigned to a particular coordinate, the object is further assigned to one of many overlapping sections within the coordinate system. Each object is assigned to a particular section of the coordinate system depending on its overall size and position.

26 Claims, 12 Drawing Sheets

SYSTEM AND METHOD OF OPTIMIZING DATABASE QUERIES IN TWO OR MORE DIMENSIONS

RELATED APPLICATIONS

This is a continuation of U.S. patent application No. 09/231,515, filed Jan. 14, 1999, which issued as U.S. Pat. No. 6,470,287, which is a divisional application of U.S. patent application No. 08/807,471, filed on Feb. 27, 1997, which issued as U.S. Pat. No. 5,963,956.

BACKGROUND OF THE INVENTION

1. Field of the Invention

This invention relates to computer databases. Specifically, this invention relates to methods of indexing database records which contain information describing the position, size and shape of objects in two and three-dimensional space.

2. Description of the Related Technology

The purpose of a data structure is to organize large volumes of information, allowing the computer to selectively process the data structure's content. The motivation for this is simple: you always have more data than your time requirements, processor speed, main memory and disk access time allow you to process all at once. Depending on the nature of the data and application, data organizing strategies may include partitioning the content into subsets with similar properties or sequencing the data to support indexing and hashing for fast random access. Databases and database management systems extend these concepts to provide persistent storage and transaction controlled editing of the structured data.

Spatial data such as that describing a two-dimensional map is no different in its need for efficient organization. Map data is particularly demanding in this regard. A comprehensive street map for a moderate sized community may consist of tens to hundreds of thousands of individual street segments. Wide area maps of LA or New York may contain millions of segments. The content of each map data object can also be some what bulky. For example, a record for an individual street segment may include the coordinates of its end points, a usage classification, the street name, street address ranges, left and right side incorporated city name and postal codes.

However, spatial data at its core poses a particularly vexing organizational problem because it tries to organize objects within two-dimensional space. Spatial coordinates consist of two (or more) values which are independent, but equally important for most spatial queries. Established data structures and database methods are designed to efficiently handle a single value, and not representations of multi-dimensional space.

This difficulty can be illustrated by considering the problem of creating an application which presents a small window of map data (for instance, the square mile surrounding a house) from a database of a few hundred thousand spatial objects (a map of the city surrounding the house). The motivation for doing this is really two fold: first, the typical resolution of a computer monitor is limited, allowing only a certain amount information to be expressed. Secondly, even if all the data fit within the monitor, the data processing time to calculate this much information (fetching, transforming, clipping, drawing) would be far too long for the average personal computer.

To solve this problem, it is advantageous to find all of the street segments which appear in the "window" that will be generated on the monitor, and avoid as many as possible which do not. Thus, all objects which are within a particular range of x-coordinate (or longitude) values and y-coordinate (or latitude) values will be gathered. This problem is generally known as rectangular window retrieval, and is one of the more fundamental types of spatial queries. This method will be used in the following sections as a method for gauging the effectiveness of each of the following organizational methods.

The most heavily researched and commonly used spatial data structures (data structures used to organize geographic and geometric data) rely on the concept of tile-based hierarchical trees. A tile in this context is a rectangular (or other regularly or irregularly shaped) partitioning of coordinate space, wherein each partition has a distinct line separating one tile from another so that no single point in the coordinate system lies within more than one tile. A hierarchical tree is one structure for dividing coordinate space by recursively decomposing the space into smaller and smaller tiles, starting at a root that represents the entire coordinate space. In this system, a "hard edge" between tiles means that every point in the space resides exactly one tile at each level of the hierarchy. No point can coexist in more than one tile.

One example of a well-known hierarchical tree is the quad-tree data structure. In one example, the quad-tree could represent the surface of the Earth. At the root of the quad-tree is a node representing the entire surface of the Earth. The root, in turn, will have four children representing each quadrant of Latitude and Longitude space: east of Greenwich and north of the Equator, east of Greenwich and south of the Equator, west of Greenwich and north of the Equator and finally, west of Greenwich and south of the equator. Points on Greenwich and the Equator are arbitrarily defined to be in one quadrant or the other. Each of these children are further subdivided into more quadrants, and the children of those children, and so on, down to the degree of partitioning which is required to support the volume and density of data which is to be stored in the quad-tree.

The principle problem with quad-tree structures is that they are unbalanced. Because each node in the tree has a limited data storage capacity, when that limit is exceeded, the node must be split into four children, and the data content pushed into lower recesses of the tree. As a result, the depth of a quad-tree is shallow where the data density is low, and deep where the data density is high. For example, a quad-tree used to find population centers on the surface of the Earth will be very shallow (e.g., have few nodes) in mid-ocean and polar regions, and very deep (e.g., have many nodes) in regions such as the east and south of the United States.

Since quad-trees are inherently unbalanced, the rectangular window retrieval behavior of a quad-tree is difficult to predict. It is difficult for software to predict how many nodes deep it may have to go to find the necessary data. In a large spatial database, each step down the quad-tree hierarchy into another node normally requires a time-consuming disk seek. In addition, more than one branch of the tree will likely have to be followed to find all the necessary data. Second, when the content of the data structure is dynamic, efficient space management is problematic since each node has both a fixed amount of space and a fixed regional coverage. In real world data schemes, these two rarely correspond. There are several variations on the quad-tree which attempt to minimize these problems. However, inefficiencies still persist.

So far, data structures containing points have only been discussed where each spatial object comprises a single set of coordinates. Lines, curves, circles, and polygons present a further complexity because they have dimensions. Therefore, these objects no longer fit neatly into tile based data structures, unless the tiling scheme is extremely contrived. There will always be some fraction of the objects which cross the hard edged tile boundaries from one coordinate region to another. Note that this fact is true regardless of the simplicity of an object's description. For example, a line segment described by its two end points, or a circle described by its center point and radius.

A simple, and commonly used way around this problem is to divide objects which cross the tile boundaries into multiple objects. Thus, a line segment which has its end points in two adjacent tiles will be split into two line segments; a line segment which starts in one tile, and passes through fifty tiles on its way to its other end will be broken into fifty-two line segments: one for each tile it touches.

This approach can be an effective strategy for certain applications which are read-only. However, it is a poor strategy for data structures with dynamic content. Adding new data objects is relatively simple, but deleting and modifying data are more difficult. Problems arise because the original objects are not guaranteed to be intact. If a line segment needs to be moved or removed, it must somehow be reconstituted so that the database behaves as expected. This requires additional database bookkeeping, more complicated algorithms and the accompanying degradation in design simplicity and performance.

Another general problem related to organizing multidimensional objects is that many of these objects are difficult to mathematically describe once broken up. For example, there are numerous ways in which a circle can overlap four adjacent rectangular tiles. Depending on placement, the same sized circle can become two, three or four odd shaped pieces. As with a heavily fragmented line segment, the original "natural" character of the object is effectively lost.

An alternate strategy is to use indirection, where objects which cross tile boundaries are multiply referenced. However, each reference requires an extra step to recover the object, and the same object may be retrieved more than once by the same query, requiring additional complexity to resolve. When the number of objects in the database becomes large, this extra level of indirection becomes too expensive to create a viable system.

Another strategy used with quad-trees is to push objects which cross tile boundaries into higher and higher levels of the tree until they finally fit. The difficulty with this strategy is that when the number of map objects contained in the higher nodes increases, database operations will have to examine every object at the higher nodes before they can direct the search to the smaller nodes which are more likely to contain useful information. This results in a tremendous lag time for finding data.

Query Optimization in a Conventional DBMS

As discussed above, data which describes the position, size and shape of objects in space is generally called spatial data. A collection of spatial data is called a Spatial Database. Examples of different types of Spatial Databases include maps (street-maps, topographic maps, land-use maps, etc.), two-dimensional and three-dimensional architectural drawings and integrated circuit designs.

Conventional Database Management Systems (DBMS) use indexing methods to optimize the retrieval of records which have specific data values in a given field. For each record in the database, the values of the field of interest are stored as keys in a tree or similar indexing data structure along with pointers back to the records which contain the corresponding values.

DATABASE TABLE 1 shows an example of a simple database table which contains information about former employees of a fictional corporation. Each row in the table corresponds to a single record. Each record contains information about a single former employee. The columns in the table correspond to fields in each record which store various facts about each former employee, including their name and starting and ending dates of employment.

DATABASE TABLE 1

The FormerEmployee database table.

| Name | StartDate | EndDate | Other . . . |
|---|---|---|---|
| P. S. Buck | Jun. 15, 1992 | Aug. 2, 1995 | |
| Willy Cather | Jan. 27, 1993 | Jun. 30, 1993 | |
| Em Dickinson | Sep. 12, 1992 | Nov. 15, 1992 | |
| Bill Faukner | Jul. 17, 1994 | Feb. 12, 1995 | |
| Ernie Hemmingway | Jun. 30, 1991 | May 14, 1993 | |
| H. James | Oct. 16, 1991 | Dec. 4, 1992 | |
| Jim Joyce | Nov. 23, 1992 | May 8, 1993 | |
| E. A. Poe | Jan. 14, 1993 | Apr. 24, 1995 | |

EXAMPLE QUERY 1 shows a SQL query which finds the names of all former employees who started working during 1993. If the number of records in the former employee database were large, and the query needs to be performed on a regular or timely basis, then it might be useful to create an index on the StartDate field to make this query perform more efficiently. Use of a sequential indexing data structure such as a B-tree effectively reorders the database table by the field being indexed, as is shown in DATABASE TABLE 2. The important property of such sequential indexing methods is that they allow very efficient search both for records which contain a specific value in the indexed field and for records which have a range of values in the indexed field.

EXAMPLE QUERY 1
SQL to find all former employees hired during 1993.

select Name
from
FormerEmployee
where
StartDate ≧ Jan. 1, 1993
and
StartDate ≦ Dec. 31 ,1993

DATABASE TABLE 2

The FormerEmployee table indexed by StartDate.

| Name | StartDate | EndDate | Other . . . |
|---|---|---|---|
| Ernie Hemmingway | Jun. 30, 1991 | May 14, 1993 | |
| H. James | Oct. 16, 1991 | Dec. 4, 1992 | |
| P. S. Buck | Jun. 15, 1992 | Aug. 2, 1995 | |
| Em Dickinson | Sep. 12, 1992 | Nov. 15, 1992 | |
| Jim Joyce | Oct. 23, 1992 | May 8, 1993 | |
| E. A. Poe | Jan. 14, 1993 | Apr. 24, 1995 | |
| Willy Cather | Jan. 27, 1993 | Jun. 30, 1993 | |
| Bill Faukner | Jul. 17, 1994 | Feb 12, 1995 | |

For analytical purposes, the efficiencies of computer algorithms and their supporting data structures are expressed in terms of Order functions which describe the approximate behavior of the algorithm as a function of the total number of objects involved. The notational short hand which is used to express Order is $O_0$. For data processing algorithms, the Order function is based on the number of objects being processed.

For example, the best sorting algorithms are typically performed at a $O(N \times \log(N))$ cost, where N is the number of records being sorted. For data structures used to manage objects (for instance, an index in a database), the Order function is based on the number of objects being managed. For example, the best database indexing methods typically have a $O(\log(N))$ search cost, where N is the number of records being stored in the database. Certain algorithms also have distinct, usually rare worst case costs which may be indicated by a different Order function. Constant functions which are independent of the total number of objects are indicated by the function $O(K)$.

B-trees and similar Indexed Sequential Access Methods (or ISAMs) generally provide random access to any given key value in terms of a $O(\log(N))$ cost, where N is the number of records in the table, and provide sequential access to subsequent records in a $O(K)$ average cost, where K is a small constant representing the penalty of reading records through the index, (various strategies may be employed to minimize K, including index clustering and caching). The total cost of performing EXAMPLE QUERY 1 is therefore $O(\log(N)+(M \times K))$, where M is the number of records which satisfy the query. If N is large and M is small relative to N, then the cost of using the index to perform the query will be substantially smaller than the $O(N)$ cost of scanning the entire table. DATA TABLE 1 illustrates this fact by showing the computed values of some Order functions for various values of N and M. This example, though quite simple, is representative of the widely used and generally accepted database management practice of optimizing queries using indexes.

FORMULA 1
Cost of retrieving consecutive records from a database table via an index.

$O(\log(N) + (M \times K))$
where
N = number of records in the table,
M = number of consecutive records which satisfy the query,
K = constant extra cost of reading records through the index.

EXAMPLE QUERY 2 shows a SQL query which finds the names of all former employees who worked during 1993. Unlike EXAMPLE QUERY 1, it is not possible to build an index using traditional methods alone which significantly improves EXAMPLE QUERY 2 for arbitrary condition boundaries, in this case, an arbitrary span of time. From a database theory point of view, the difficulty with this query is due to the interaction of the following two facts: because the two conditions are on separate field values, all records which satisfy one of the two conditions need to be inspected to see if they also satisfy the other; because each condition is an inequality, the set of records which must be inspected therefore includes all records which come either before or after one of the test values (depending on which field value is inspected first).

EXAMPLE QUERY 2
SQL to find all former employees who worked during 1993.

select Name
from FormerEmployee
where EndDate ≥ Jan. 1, 1993
and StartDate ≤ Dec. 31, 1993

Consider the process of satisfying EXAMPLE QUERY 2 using the index represented by DATABASE TABLE 2. The cost of performing EXAMPLE QUERY 2 using an index based on either of the two fields would be $O(K \times N/2)$ average cost and $O(K \times N)$ worst-case cost. In other words, the query will have to look at half the table on average, and may need to inspect the whole table in order to find all of the records which satisfy the first of the two conditions. Since the cost of scanning the entire table without the index is $O(N)$, the value of using the index is effectively lost (refer to TABLE 3). Indeed, when this type of circumstance is detected, query optimizers (preprocessing functions which determine the actual sequence of steps which will be performed to satisfy a query) typically abandon the use of an index in favor of scanning the whole table.

FORMULA 2
Cost of retrieving all records which overlap an interval using a conventional database index on the start or end value.

$O(K \times N/2)$ average,
$O(K \times N)$ worst case.

DATA TABLE 1

Comparison of Order function results for various values of N and M. A K value of 1.5 is used for the purpose of this example.

| N, O(N) | M | O(log(N)) | O(log(N) + (M × K)) | O(K × N / 2) |
|---|---|---|---|---|
| 100 | 5 | 2 | 10 | 75 |
| 100 | 10 | 2 | 17 | 75 |
| 100 | 50 | 2 | 77 | 75 |
| 1000 | 5 | 3 | 11 | 750 |
| 1000 | 10 | 3 | 18 | 750 |
| 1000 | 50 | 3 | 78 | 750 |
| 10000 | 5 | 4 | 12 | 7500 |
| 10000 | 10 | 4 | 19 | 7500 |
| 10000 | 50 | 4 | 79 | 7500 |

From a more abstract point-of-view, the difficulty with this example is that there is actually more information which the conventional database representation does not take into account. StartDate and EndDate are in fact two different facets of a single data item which is the contained span of time. Put in spatial terms, the StartDate and EndDate fields define two positions on a Time-Line, with size defined by the difference between those positions. For even simple one-dimensional data, conventional database management is unable to optimize queries based on both position and size.

Introduction to two-dimensional Spatial Data

Spatial databases have a particularly demanding need for efficient database management due to the huge number of objects involved. A comprehensive street map for a moderate sized community may consist of tens to hundreds of thousands of individual street blocks; wide area maps of Los Angeles, Calif. or New York, N.Y. may contain more than a million street blocks. Similarly, the designs for modem integrated circuits also contain millions of components.

FIG. 1 illustrates a coordinate plane with X- and Y-axes. For the purpose of the following example, the size of the plane is chosen to be 200×200 coordinate units, with the minimum and maximum coordinates values of −100 and 100 respectively for both X and Y. However, it should be noted that the principles discussed for the following example can be applied to any bounded two-dimensional coordinate system of any size, including, but not limited to planer, cylindrical surface and spherical surface coordinate systems. The latitude/longitude coordinate system for the earth's surface, with minimum and maximum latitude values of −90 degrees and +90 degrees, and minimum and maximum longitude values of −180 degrees and +180 degrees, is an example of one such spherical coordinate system.

FIG. 2 illustrates a distribution of points on the FIG. 1 plane. Ad discussed above, points are the simplest type of spatial data object. Their spatial description consists of coordinate position information only. An example of non-spatial description commonly associated with point objects might include the name and type of a business at that location, e.g., "Leon's BBQ", or "restaurant".

FIG. 3 illustrates a distribution of linear and polygonal spatial data objects representing a map (note that the text strings "Hwy 1" and "Hwy 2" are not themselves spatial data objects, but rather labels placed in close proximity to their corresponding objects). The spatial descriptions of linear and polygonal data objects are more complex because they include size and shape information in addition to solely their position in the coordinate system. An example of non-spatial description commonly associated with linear map objects might include the names and address ranges of the streets which the lines represent, e.g., "100–199 Main Street". An example non-spatial description commonly associated with polygonal map objects are the name and type of the polygon object, e.g., "Lake Michigan", "a great lake".

FIG. 4 illustrates the Minimum Bounding Rectangles (MBRs) of various of linear and polygonal spatial data objects. The Minimum Bounding Rectangle of a spatial data object is the smallest rectangle orthogonal to the coordinate axis which completely contains the object. Minimum Bounding Rectangles are typically very easy to compute by simple inspection for the minimum and maximum coordinate values appearing in the spatial description. In spatial data storage and retrieval methods, Minimum Bounding Rectangles are often used represent the approximate position and size of objects because the simple content (two pairs of coordinates) lends itself to very efficient processing.

Storing two-dimensional Spatial Data in a Conventional Database Management System DATABASE TABLE 3 shows how some of the points from FIG. 2 might be represented in a regular database table. The points in DATABASE TABLE 3 correspond to the subset of the points shown in FIG. 2 indicated by the * markers. EXAMPLE QUERY 3 shows a SQL query which fetches all points within a rectangular window. A rectangular window query is among the simplest of the commonly used geometric query types. Inspection reveals that "Emily's Bookstore" is the only record from DATABASE TABLE 3 which will be selected by this query. FIG. 5 shows the rectangular window corresponding to EXAMPLE QUERY 3 superimposed on the points shown in FIG. 2.

DATABASE TABLE 3

A conventional database table containing some business locations.

| X | Y | Name | Type |
|---|---|---|---|
| −42 | 25 | Leon's BBQ | Restaurant |
| 9 | −34 | Super Saver | Grocery Store |
| 17 | 21 | Emily's Books | Book Store |
| 68 | −19 | Super Sleeper | Motel |
| −84 | 7 | Bill's Garage | Gas Station |

EXAMPLE QUERY 3
SQL to find all businesses in a window.

select Name, Type
from BusinessLocation
where X ≧ 10 and X ≦ 35
and Y ≧ 15 and Y ≦ 40

The principle problem illustrated by this example is that the traditional query optimization method of building a simple index doesn't work well enough to be useful. Consider building an index based on the X field value. Use of this index to satisfy EXAMPLE QUERY 3 will result in an over-sampling of the database table illustrated by the two thick vertical bars shown in FIG. 6. When the query is performed, the records for all point objects which are between those two bars will need to be examined to find the much smaller subset which actually fits within the shaded window. The "Super Saver" record of DATABASE TABLE 3 is an example of a record which would be needlessly examined.

While the work required to start the query is logarithmic, the expected number of point objects which are oversampled is a linear function of the number of point objects in the database, as is shown by FORMULA 3. This means that the performance of this query will tend to degrade linearly as the number of objects in the database increases. When data volumes become large, this linear behavior will becomes much worse than the preferred O(log(N)), effectively making this style of solution ineffective. The same problem occurs with an index based on Y. The root cause of this problem is the fact that two-dimensional spatial coordinates consist of two values (X and Y) which are independent, but which are also equally important for most spatial queries. Conventional database management techniques are poorly suited to handling two-dimensional data.

FORMULA 3
Average cost of performing a two-dimensional rectangular window query using conventional database indexing methods, assuming a mostly even distribution in X.

$O(\log(N)) + (K \times N \times C_X / W_X))$
where
N = number of
records in the table,
K = constant -continued FORMULA 3
Average cost of performing a two-dimensional
rectangular window query using conventional
database indexing methods, assuming a mostly
even distribution in X.

extra cost of reading
records
through the index.
$C_X$ = width of the
coordinate
space,
$W_X$ = width of the
rectangle.

Description of Related two-dimensional Spatial Data Structures

The problems which conventional database management methods have with spatial data have led to the development of a variety of special purpose data storage and retrieval methods called Spatial Data Structures. *The Design and Analysis of Spatial Data Structures* by Hanan Samet includes a review of many of these methods. Many of the commonly used spatial data structures rely on the concept of tile based hierarchical trees.

FIG. 7 shows a rectangular recursive decomposition of space while FIG. 8 shows how the tiles formed by that decomposition can be organized to form a "tree" (a hierarchical data structure designed for searching). Data structures of this type are called Quad-Trees. FIG. 9 shows the points from FIG. 2 distributed into the "leaf-nodes" of this Quad-Tree.

FIG. 10 shows the subset of the Quad-Tree which is contacted by the Rectangular Window Retrieval of EXAMPLE QUERY 3. Note the contrast between the two bottom level nodes which must be inspected in the Quad-Tree, versus the long stripe which must be inspected using conventional database indexing as shown in FIG. 6. All of the inspected points from the two nodes in FIG. 10 are at least in the neighborhood of the rectangle, whereas some points inside the stripe in FIG. 6 are literally at the far edge (bottom) of the coordinate system. While the difference in number of inspected points is not great due to the simplicity of this example, the performance contrast is dramatic when the number of point objects is very large. The Quad-Tree is much better suited to storing position based data because it simultaneously indexes along both axis of the coordinate system.

In the most basic implementation of Quad-Trees, each tile in the hierarchy corresponds to a "record" containing information which pertains to that tile. If the tile is at the root or at a branch level, the corresponding record will contain the coordinates of, and pointers to, the records for each child tile. If the tile is at the leaf level, the corresponding record contains the subset of the spatial data objects (point, line or polygon objects and their attributes) which are geometrically contained within the tile's perimeter. The Quad-Tree database "records" are stored in a disk file in breadth first or depth first order, with the root at the head of the file. There are also variations which keep some spatial data objects at higher levels of the hierarchy, and which don't actually create records for leaves and branches which are either mostly or completely empty. For instance, leaves 133 and 144 in FIG. 9 are both empty.

An advantage of the Quad-Tree data structure is that it exhibits O(log(N)) cost when the spatial density of data is fairly uniform, therefore resulting in a well balanced tree. The balance is driven by the construction algorithms which control the amount of branching. The amount of branching (and therefore the maximum depth) in a Quad-Tree is driven by an interaction between the local density of spatial data objects and the maximum number of such objects which can be accommodated in a leaf level record. Specifically, when the data storage in a leaf record fills up, the leaf is split into four children with its spatial data objects redistributed accordingly by geometric containment. Each time this happens, the local height of the tree increases by one. As a result of this algorithmic behavior, however, very high local data densities can cause Quad-Tree performance to degrade toward O(N) cost due to exaggerated tree depth.

There are also a wide variety of non-hierarchical uses of hard edged tiles within a coordinate system. One such method uses space filling curves to sequence the tiles. FIG. 11 shows such a sequencing of a 4×4 tiling using the Peano-Hilbert curve. The resulting tiles are 50 units on a side. The tiles thus sequenced can be stored in records similar to the leaves in a Quad-Tree, where the data stored in each record corresponds to the subset contained within the tile's perimeter. The records can be simply indexed by a table which converts tile number to record location.

The tiles can also be used as a simple computational framework for assigning tile membership. DATABASE TABLE 4 shows the business location database table enhanced with corresponding tile number field from FIG. 11. The tile number is determined by computing the binary representations of the X and Y column and row numbers of the tile containing the point, and then applying the well known Peano-Hilbert bit-interleaving algorithm to compute the tile number in the sequence. Building an index on the tile number field allows the records to be efficiently searched with geometric queries, even though they are stored in a conventional database. For instance, it is possible to compute the fact that the rectangular window SQL query shown in EXAMPLE QUERY 3 can be satisfied by inspecting only those records which are marked with tile numbers 8 or 9.

DATABASE TABLE 4

The BusinessLocations database table enhance with a Tile field.

| Tile | X | Y | Name | Type |
|------|-----|-----|---------------|---------------|
| 8 | −42 | 25 | Leon's BBQ | Restaurant |
| 14 | 9 | −34 | Super Saver | Grocery Store |
| 9 | 17 | 21 | Emily's Books | Book Store |
| 13 | 68 | −19 | Super Sleeper | Motel |
| 4 | −84 | 7 | Bill's Garage | Gas Station |

Analysis of the expected cost of this system shows the importance of tile granularity which this and all similar systems share. Extrapolating from the Order function for database queries given in FORMULA 1, the order function for this method is given by FORMULA 4. For a fixed sized window retrieval rectangle, the expected number of tiles is given by FORMULA 5, (the 1 is added within each parentheses to account for the possibility of the window retrieval crossing at least one tile boundary). For a given average size window retrieval, the value of A in FORMULA 4 is therefore an inverse geometric function of the granularity of the tiling which can be minimized by increasing the granularity of the tiling. The expected number of points per tile is given by FORMULA 6. For a given average data density, the value of B in FORMULA 4 is therefore roughly a quadratic function of the granularity of the tiling which can be minimized by decreasing the granularity of the tiling. For a given average retrieval window size and average data density, the expected value of FORMULA 4 can therefore be minimized by adjusting the granularity of the tiling to find the point where the competing trends of A and B yield the best minimum behavior of the system.

---

FORMULA 4
Expected cost of window retrieval using tile numbers embedded in a database table.

$O(A \times (\log(N) + K \times B))$
where
A = expected
number of tiles
needed to
satisfy the query,
B = expected
number of objects
assigned to
each tile.

---

FORMULA 5
Expected number of tiles per retrieval.

$A = \text{round\_up}(W_X / T_X + 1)$
$\times \text{round\_up}(W_Y / T_Y + 1)$
where
$W_X$ = width of
the rectangle,
$T_X$ = width of a
tile,
$W_Y$ = height of
the rectangle,
$T_Y$ = height of a
tile.

---

FORMULA 6
Expected number points per tile.

$B = T_X \times T_Y \times D$
where
$T_X$ = width of a
tile,
$T_Y$ = height of a
tile,
D = average
density of points.

---

While this technique still over-samples the database, the expected number of records which will be sampled is a function of the average number of records in a tile multiplied by the average number of tiles needed to satisfy the query. By adjusting the tile size, it is possible to control the behavior of this method so that it retains the O(log(N)) characteristics of the database indexing scheme, unlike a simple index based only on X or Y coordinate. Oracle Corporation's implementation of two-dimensional "HHCODES" is an example of this type of scheme.

The problem which all tile based schemes suffer is that higher dimension objects (segments, polylines, polygons) don't fit as neatly into the scheme as do points as FIGS. 12 and 13 illustrate. FIG. 12 shows how the linear and polygonal data objects from FIG. 3 naturally fall into the various nodes of the example Quad-Tree. Note how many objects reside at higher levels of the Quad-Tree. Specifically, any object which crosses one of the lower level tiles boundaries must be retained at the next higher level in the tree, because that tile is the smallest tile which completely covers the object. This is the only way that the Quad-Tree tile hierarchy has of accommodating the object which might cross a boundary as a single entity.

FIG. 13 shows the dramatic impact which the data that is moved up the hierarchical tree has on the example rectangular window retrieval. Since linear and polygonal data has size in addition to position, some substantial subset will always straddle the tile boundaries. As the number of objects in the database grows, the number of objects which reside in the upper nodes of the quad-tree will also grow, leading to a breakdown of the performance benefit of using the structure. This problem is shared by all hard tile-boundaried methods (Quad-Trees, K-D Trees, Grid-Cells and others).

There are three principle ways used to get around the problem of managing objects that straddle tile boundaries: 1) break up any objects which cross tile boundaries into multiple fragments, thereby forcing the data objects to fit, 2) duplicate the objects once for each extra tile that the object touches, and 3) indirectly referencing each object, once for each tile that it touches. Fragmentation in particular is most often used in read-only map data applications. While each of these methods has its respective strengths, a weakness shared by all of them is the great increase in implementation complexity, particularly when the content of the spatial database must be edited dynamically. Note also that these techniques need to be applied to each of the offending objects, which, as the object population in the middle and upper level nodes of FIG. 13 shows, is likely to be a substantial fraction of the database.

The R-Tree (or Range-Tree) is a data structure which has evolved specifically to accommodate the complexities of linear and polygonal data. Like Quad-Trees, R-Trees are a hierarchical search structure consisting of a root and multiple branch levels leading to leaves which contain the actual spatial data. Unlike Quad-Trees which are built from a top-down regular partitioning of the plane, R-Trees are built bottom-up to fit the irregularities of the spatial data objects. Leaf-level records are formed by collecting together data objects which have similar size and locality. For each record, a minimum bounding rectangle is computed which defines the minimum and maximum coordinate values for the set objects in the record. Leaf records which have similar size and locality are in turn collected into twig-level'records which consist of a list of the minimum bounding rectangles of and pointers to each of the child records, and an additional minimum bounding rectangle encompassing the entire collection. These twig records are in turn collected together to form the next level of branches, iterating until the tree converges to a single root record. Well balanced R-Trees exhibit O(log(N)) efficiency.

The difficulty with R-Trees is that, since there definition is dependent on how the data content "fits" together to build the tree, the algorithms for building and maintaining R-Trees tend to be complicated and highly sensitive to that data content. Static applications of R-Trees, where the data content does not change, are the easiest to implement. Dynamic applications, where the data is constantly being modified, are much more difficult. This is in part because the edit operations which modify the geometric descriptions of the spatial data, by implication have the potential to change the minimum bounding rectangle of the containing record, which in turn can effect the minimum bounding rectangle of the parent twig record, and so on up to the root. Any operation therefore has the potential to cause significant reorganization of the tree structure, which must be kept well balanced to maintain O(log(N)) efficiency.

In summary, a variety of special purpose data structures have evolved to meet the particular requirements of multi-dimensional spatial data storage. While these techniques effectively solve some of the problems associated with two-dimensional spatial data, they also share the same inherent weakness which one-dimensional methods have when dealing with data which represents a continuous range of values. In the one-dimensional case, the problem data object types are closed intervals of a single variable, for example, intervals of time. In the two-dimensional case, the problem data object types such as lines, circles and polygons are described by closed intervals of two variables.

Description of three-dimensional and Higher Dimension Spatial Data Structures

Spatial data which describe a three-dimensional surface has similar requirements for efficient organization. The added complexity is that three-dimensional spatial data consists of 3 independent variables (X, Y and Z) which have equal weight. three-dimensional geometric descriptions of lines, surfaces and volumes are also more complicated than two-dimensional lines and polygons, which make the data somewhat bulkier.

However, the basic database organizational problems in three-dimensional are fundamentally the same as those in two-dimensional space, and are therefore amenable to very similar solutions. There is a three-dimensional equivalent to Quad-Tree which uses a regular cubic partitioning of three-dimensional space. Oracle Corporation has also implemented a three-dimensional version of its "HHCODE" technology for storing point objects. There is also a three-dimensional equivalent to R-Trees which uses three-dimensional minimum bounding boxes to define the coordinate extent of leaves and branches. These techniques also share the same limitations as one-dimensional and two-dimensional techniques when handling data representing continuous three-dimensional intervals.

The same principles also apply to organizing higher dimension data. In particular, Oracle Corporation has extended its "HHCODE" technology to accommodate point objects of up to 11 dimensions.

As described above, there are several problems associated with efficiently organizing and indexing multi-dimensional spatial data within a database. For this reason, an improved method for staring spatial data would be advantageous. This advantage is provided by the system of the present invention.

SUMMARY OF THE INVENTION

As discussed above, databases of information can comprise hundreds of megabytes of data, thereby being very difficult to efficiently search. However, multidimensional data that is stored with the method and system of the present invention can be retrieved with far fewer processor cycles and disk seeks than in prior systems.

In the past, one way of organizing large quantities of spatial data was to first overlay a coordinate system onto the spatial data. Each object within the spatial database would be assigned X and Y coordinates. Larger objects, such as lines, polygons and other shapes would be assigned a single location point within the coordinate system that would act like an anchor to hold the object to its position. For example, a line might have a location point that corresponds to one of its ends, and the rest of the object would contain information about the other ends' X and Y coordinates, the line's thickness, color, or other features. In this manner, each object within the spatial database would have a single location point, no matter how large the object was in the database.

By separating the larger coordinate system into sub-regions, each location point could be assigned to a particular sub-region. These sub-regions are known as tiles because they resemble a series of tiles once superimposed over a coordinate system that included a set of spatial data. Each tile would, therefore, hold a particular set of spatial data. Thus, a user that knew which tiles held the desired information only needed to search those specific tiles. Once the computer user identified spatial data in a desired region of the spatial database, the system read those few tiles from memory and began the process of gathering objects from those tiles. This method thereby prevented the system from analyzing every object in the entire database for every computer user's request.

While this system of assigning a title number to data objects worked well for data comprising only points, it was very slow when larger data objects were involved. Larger data objects could be lines, circles or polygons within the spatial database. Many problems related to organizing spatial data objects had to do with the difficulty of assigning these objects to only one tile, when the object traversed across many tiles. For example, a long line that crosses over three tiles can pose many problems. Since no particular tile is assigned to the long line, the line might be assigned to either the wrong tile or a series of tiles. Assigning an object, such as a line, to multiple tiles leads to a tremendous computer overhead since all of these associations must be maintained in the computer system.

The one embodiment reduces these previous problems by providing a series of overlaps between every tile in a spatial database. These overlapping tiles, termed herein "shingles", represent tiles that overlap their nearest four neighbors. The area of overlap for any shingle can be pre-determined to provide the maximum efficiency. For example, a spatial database holding map data might be programmed to have a shingle size of 10 square miles with each single overlap comprising 5 square miles. Thus, every shingle would have an overlap with its nearest four neighbors that is equal to the size of the neighboring shingles. The shingle overlap allows more data objects in the spatial database to be assigned to only one shingle and not split between multiple hard edged tiles. As discussed above, dividing an object across multiple tiles is very disadvantageous because it requires the system to track every tile that is assigned to a particular object.

Thus, the purpose of the tiered shingle structure is to provide a logical framework for resolving Spatial Queries into the database in a timely and efficient manner. The spatial data structure is conceptual structure that provides the organization for indexing objects within a spatial data set. The tiered shingle structure does not have to be embodied in a specific computer data structure to be useful and effective. The Tiered Shingle Structure is part of a computational tool for organizing a set of spatial data objects, such as lines, squares and polygons into subsets based on their similar position and size in space. In addition, the tiered shingle structure can provide a mechanism for identifying those subsets of the database which contain the necessary and sufficient spatial data objects required by a specific spatial query into the database.

The system and method of the present invention alleviates the problems found in prior systems of small objects which cross title boundaries being moved to higher levels in the tree. In one embodiment the layers of sub-regions are generated, the tiles are calculated to have areas which overlap. Therefore, no hard edges exist between tiles or an object might reside in two tiles simultaneously. These overlapping sub-regions are termed shingles. Because a shingle might overlap with, for example, one half of its closest neighbors, objects which fit into the large shingle region will remain at the lowest possible level. Another advantage of the present invention is that it improves the efficiency of individual databases because the shingle overlap size in each layer can be pre-programmed to provide the fastest access to the spatial database.

A database with numerous small objects, such as streets, can be programmed with a smaller shingle overlap size than databases that have numerous large objects, such as freeways. Tailoring the size of the shingles and overlap areas to the size of the average data object keeps more data objects at a single, lower level within the database architecture of the present invention. However, any data object that cannot fit within one shingle can be stored in the next higher level of shingling.

For example, the first level of shingling might have a shingle size of 5 square miles and divide the map database into 10,000 shingles. However, the second level of shingling might have a shingle size of 10 square miles and divide the map database into 2500 shingles. This will be discussed more specifically below in reference to FIG. 12.

One embodiment of the invention is a method of organizing spatial data objects in a map database, including referencing data objects as location points in a region to a coordinate system; separating the region into multiple sub-regions and assigning the data objects whose location point falls within a sub-region to the sub-region so long as no part of the object extends outside the sub-region by a predetermined amount.

Another embodiment of the present invention is a method of storing spatial data objects to a computer memory, comprising the steps of (1) determining the size of each data object within a coordinate system; (2) assigning each spatial data object to a location point in the coordinate system; (3) calculating the boundaries of a first tier of overlapping sub-regions of the coordinate system so that each point in the coordinate system is assigned to at least one sub-region; (4) referencing each spatial data object that is smaller than the size of said sub-regions in the first tier to a specific sub-region of the coordinate system based on the location point of each spatial data object; and (5) storing the spatial data objects along with its reference to a specific sub-region to the computer memory.

DETAILED DESCRIPTION OF THE PREFERRED EMBODIMENT

Reference is now made to the drawings wherein like numerals refer to like parts throughout. For convenience, the following description will be organized into the following principle sections: Overview, Functional Description, Example Implementation within a Database Table, Empirical Analysis, Mathematical Analysis and Conclusion.

1. Overview

The present invention is a method and system for organizing large quantities of data. Although the examples used to illustrate the embodiment of this invention are for organizing map data, the techniques can be applied to other types of data. Other applicable data types include engineering and architectural drawings, animation and virtual reality databases, and databases of raster bit-maps.

Additionally, although the figures describe an embodiment of the invention that could be used to organize data representing an object of two dimensions, the present invention is applicable to organizing data for objects of three or more dimensions.

Thus, as discussed above, the purpose of the tiered shingle structure is to provide a logical framework for resolving spatial queries into a computer database in a timely and efficient manner. The tiered shingle structure does not have to be embodied in a specific computer data structure to be useful and effective. The tiered shingle structure is part of a computational tool for organizing a set of spatial data objects, such as lines, squares and polygons into subsets based on their similar position and size in space. In addition, the tiered shingle structure provides a mechanism for identifying those subsets of the database which contain the necessary and sufficient spatial data objects required by a specific spatial query into the database. In addition, the tiered shingle structure can run on an Intel® processor based computer system in one preferred embodiment. However, other computer systems, such as those sold by Apple®, DEC® or IBM® are also anticipated to function within the present invention.

Figure 1:
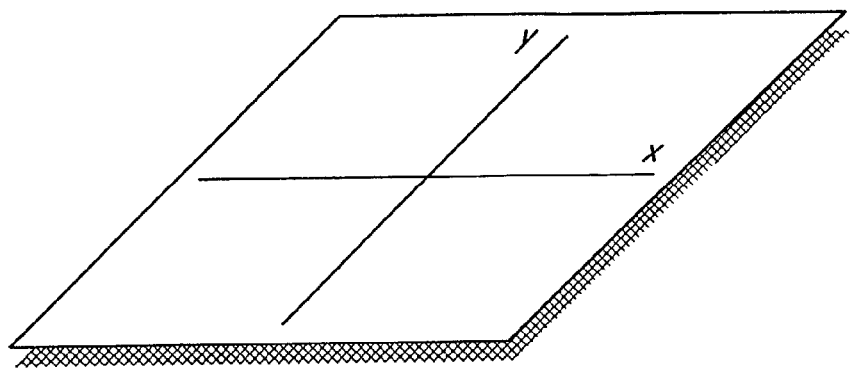
FIG. 1 is a diagram illustrating a coordinate plane in two-dimensional space.
Figure 2:
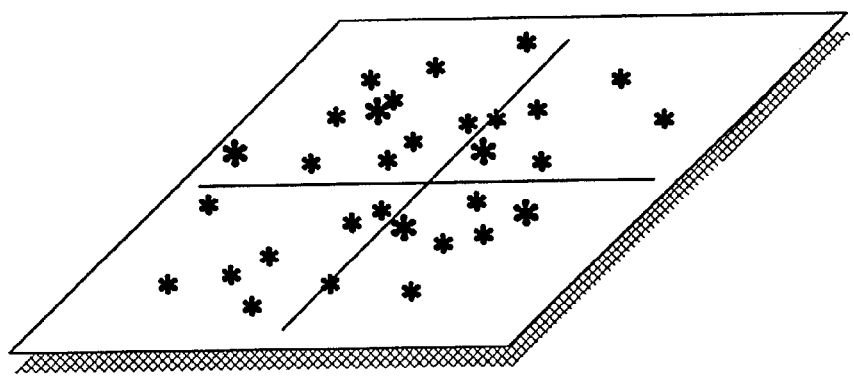
FIG. 2 is a diagram of a computer database depicting a distribution of point spatial data objects on the coordinate plane of FIG. 1.
Figure 7:
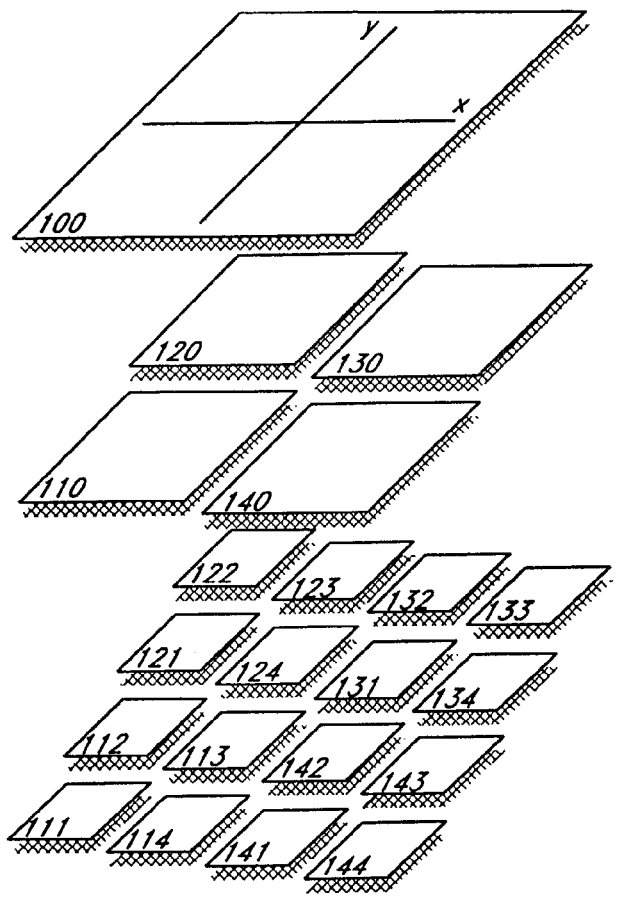
FIG. 7 is an illustration of a regular quadrant-based decomposition of the coordinate plane of FIG. 1.
Figure 14:
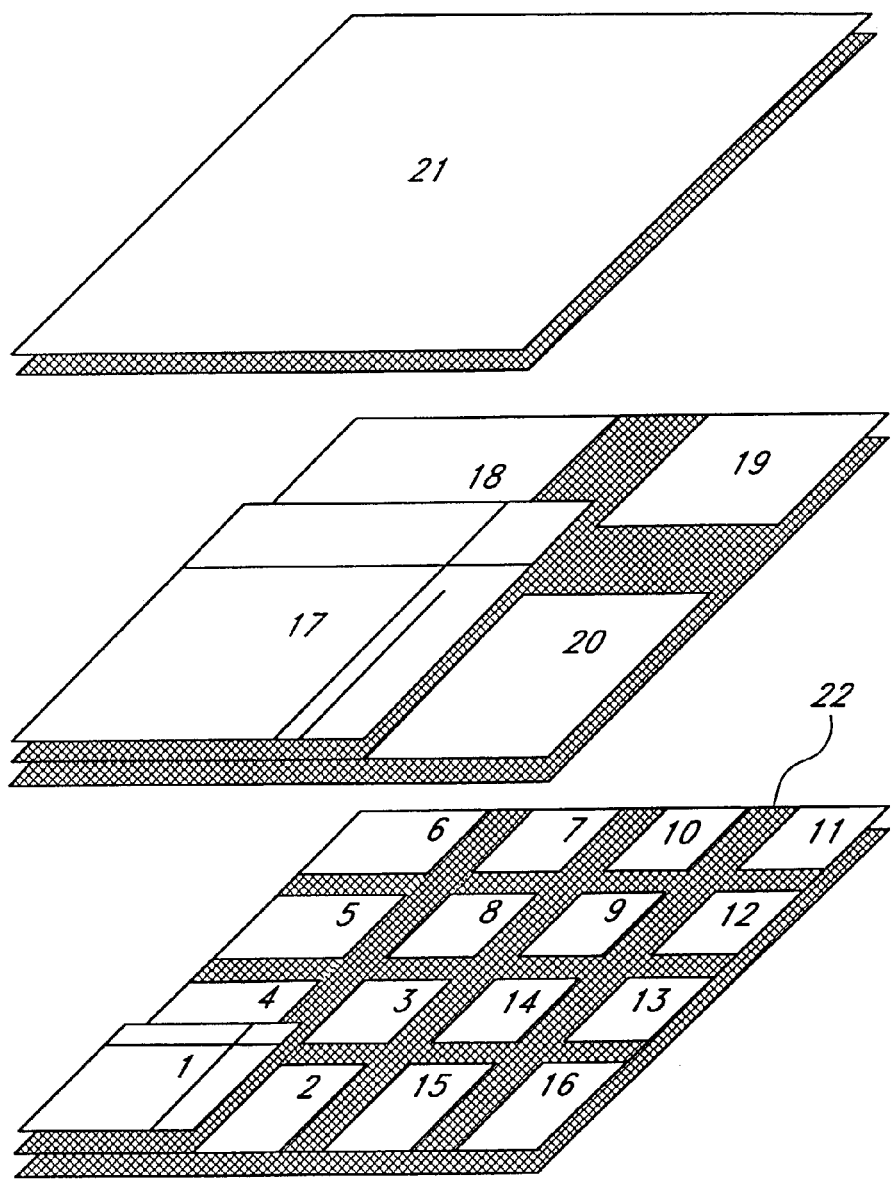
FIG. 14 is an illustration of the organization of a computer database having a three level tiered shingle structure applied to the coordinate plane.

FIG. 14 is an illustration of a three level tiered shingle structure as it would be applied to the example coordinate plane shown in FIG. 1. This Tiered Shingle Structure is similar to the regular quadrant-based decomposition of the coordinate plane shown in FIG. 7. However, rather than each level data structure being organized with discrete, hard-edged tiles, each level consists of overlapping shingles. The overlap between adjacent shingles will be discussed in more detail below, but is indicated by the shaded bands 22 in FIG. 14. Note that shingles 1-18 formed by regular overlapping squares or rectangles which are normal to the coordinate axis are the easiest to understand and implement, though other configurations are possible.

The finest level in a Tiered Shingle Structure (shingles 1-16 in FIG. 14) is designed to serve as the indexing medium for the vast majority of the spatial data. Thus, it is desirable for the majority of data objects to be assigned to shingles in this level of the data structure. Thus, the spatial objects which extend beyond the edge of the central portion of the shingle by more than a predetermined amount (e.g., its overlap will be assigned to the next higher tier in the hierarchy). The granularity (size of shingle and amount of overlap) of that finest level can be tuned to balance between the competing trends of maximizing the number of spatial data objects which "fit" in that level of shingling (accomplished by increasing the size of the shingles), versus maximizing the degree of partitioning (accomplished by decreasing the size of the shingles). The coarser levels of shingles (a single level in FIG. 14 consisting of shingles 17–20) serve as an alternative indexing medium for those objects which do not fit in the finest level (i.e., any object which is spatially too large to fit within a particular tile), including its shingled overlap with its nearest neighbors. Note that the absolute size of the overlap increases as the tile size increases in each successively coarser level. Finally, there is the top-level shingle 21 (FIG. 14) which is used to assign those few objects which are too large to fit within other tiles of the data structure.

Figure 3:
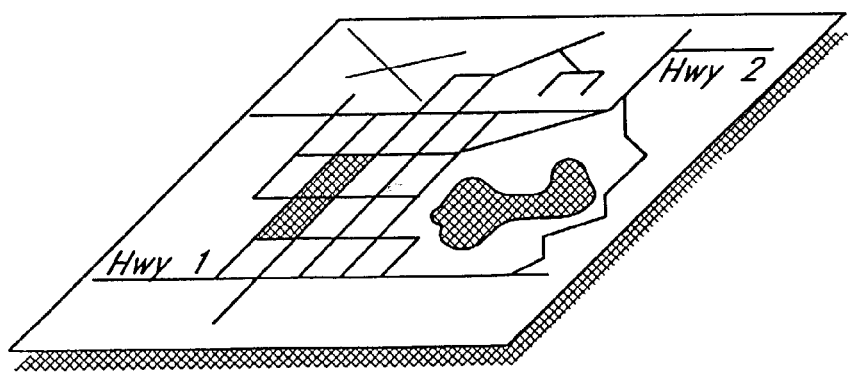
FIG. 3 is a diagram of a computer database showing a distribution of linear and polygonal spatial data objects representing a map on the coordinate plane of FIG. 1.
Figure 15:
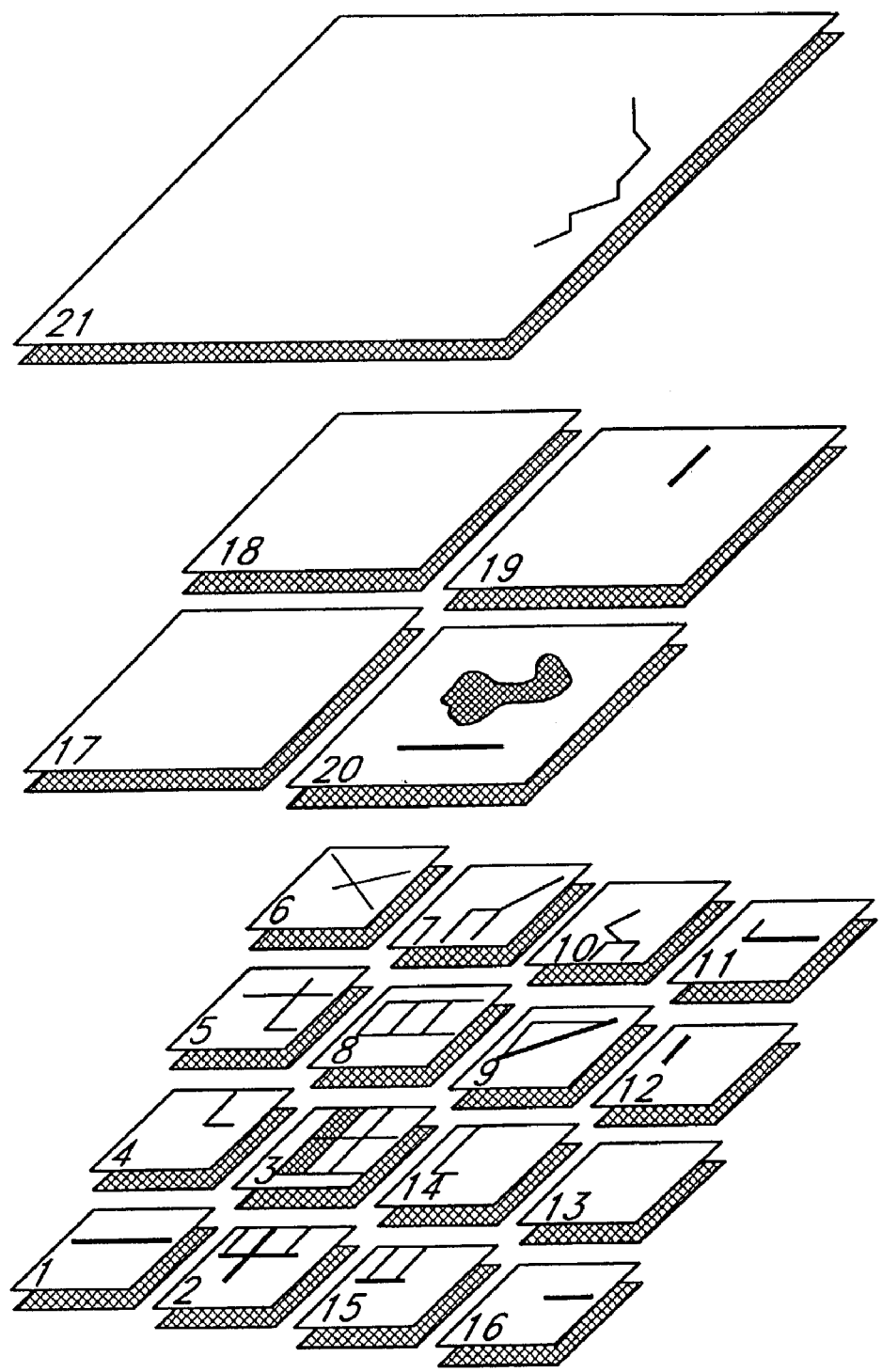
FIG. 15 is an illustration of linear and polygonal map data elements distributed into a computer database that is organized using the Tiered Shingle Structure of the present invention.

FIG. 15 is an illustration of how each of the linear and polygonal objects depicted in the FIG. 3 are organized within the Tiered Shingle Structure data structure of the present invention. As will be explained below, each shingle contains a subset of the objects having a similar position and size. The benefit of regular overlapping tiles provided by the data structure of the present invention can be seen by comparing the present invention data structure organization of FIG. 15 with the data structure organization of FIG. 12. This shingled overlap system allows the small data objects which were located on the arbitrary tile boundaries of the prior art data structures (the bulk of the population in tiles 100, 110, 120, 130 and 140 in FIG. 12) to remain within the lowest level in the Tiered Shingle Structure. Specifically, any object which is smaller than the size of the overlap at any given level is guaranteed to fit into some shingle at or below that level. In addition, many objects which are larger than the shingle overlap may also fit within a lower level. For example, shingles 1, 6 and 9 in FIG. 15 are mostly populated by such objects. Note the position of those same objects in FIG. 12. DATA TABLE 2 provides a numerical comparison of the data object partitioning in FIG. 15 versus FIG. 12.

Figure 13:
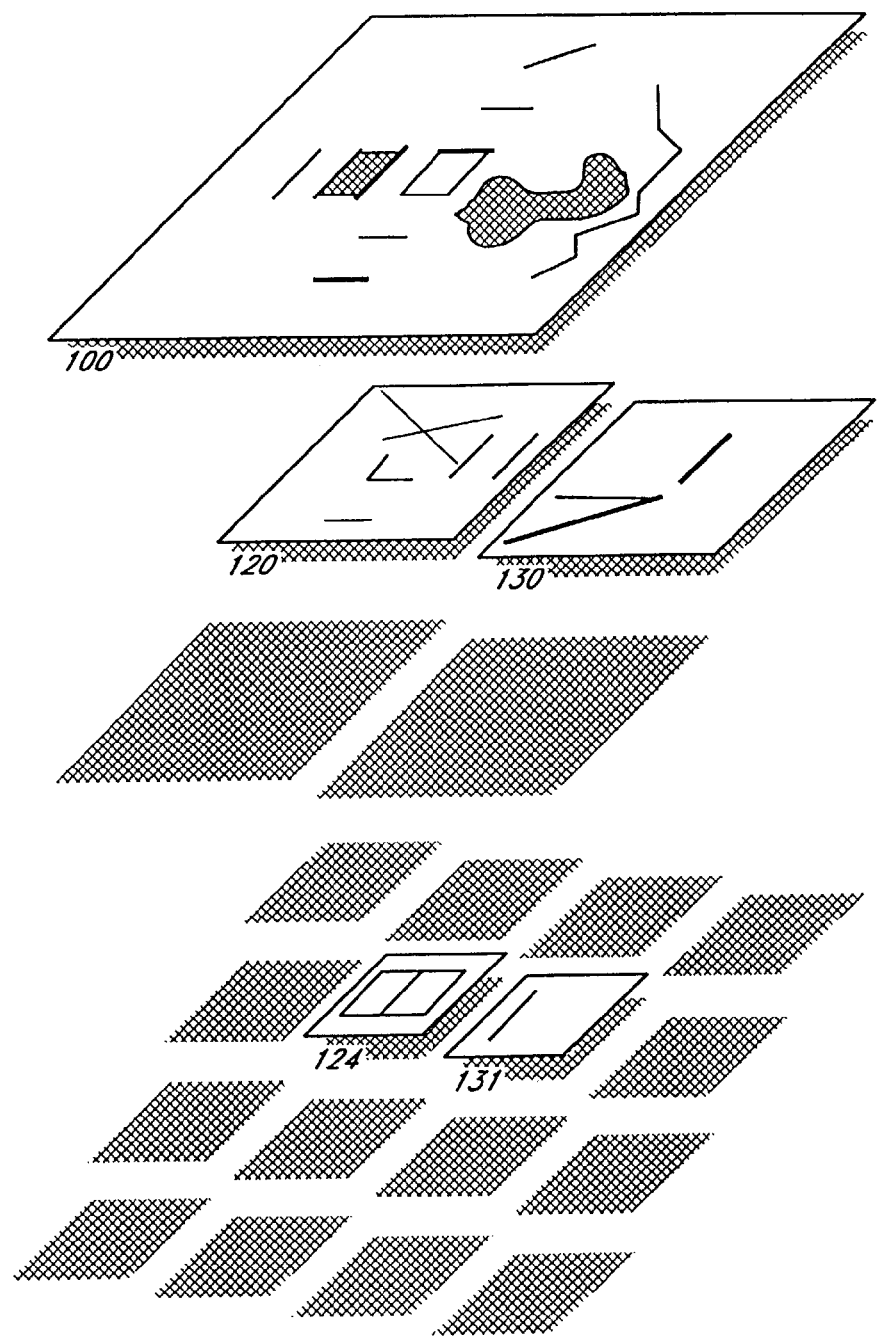
FIG. 13 is an illustration of a rectangular window retrieval applied to a computer database that is organized as a Quad-Tree and contains linear and polygonal data. This illustration demonstrates the ineffectiveness of organizing two-dimensional data into this type of data structure and managing spatial data which has an inherent size.
Figure 16:
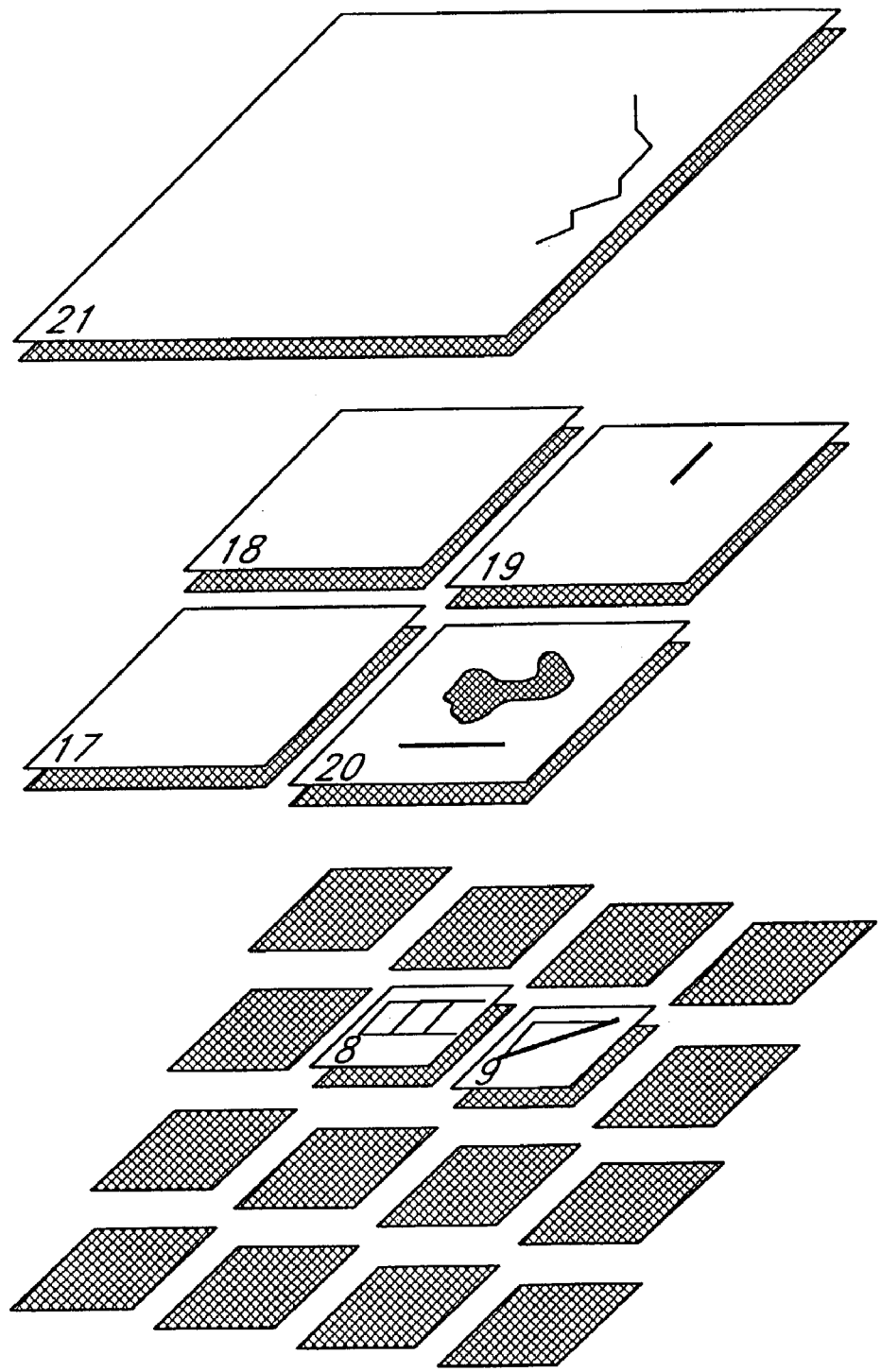
FIG. 16 is an illustration of a rectangular window retrieval for a computer database applied to the Tiered Shingle Structure of the present invention and showing the effectiveness of this data structure for managing spatial data which has size.

Contrasting FIG. 16 to FIG. 13 shows why the improved partitioning scheme provided by the Tiered Shingle Structure translates into improved rectangular window query performance over an equivalent structure based on prior art. While the number of tiles which need to be inspected during a data query has slightly increased from five in FIG. 13 to seven in FIG. 16, the number of data objects which must be inspected has dropped by nearly half (sixteen versus thirty-one). This drop is directly due to the fact that many more objects can be fit into the finer partition levels with only a slight increase in the size of each partition. As discussed above, a spatial data query must inspect every object within each tile that meets the parameters of the query. Thus, for FIG. 13, each of the data objects within the top-level tile 100 must be inspected to determine whether it meets the parameters of the spatial data query. Because so many more data objects are able to reside in the smaller tile structures when organized by the method of the present invention, there are many fewer data objects to inspect during a spatial data query. For this reason, computer databases that are organized by the system of the present invention can be searched more rapidly than prior art systems.

Figure 12:
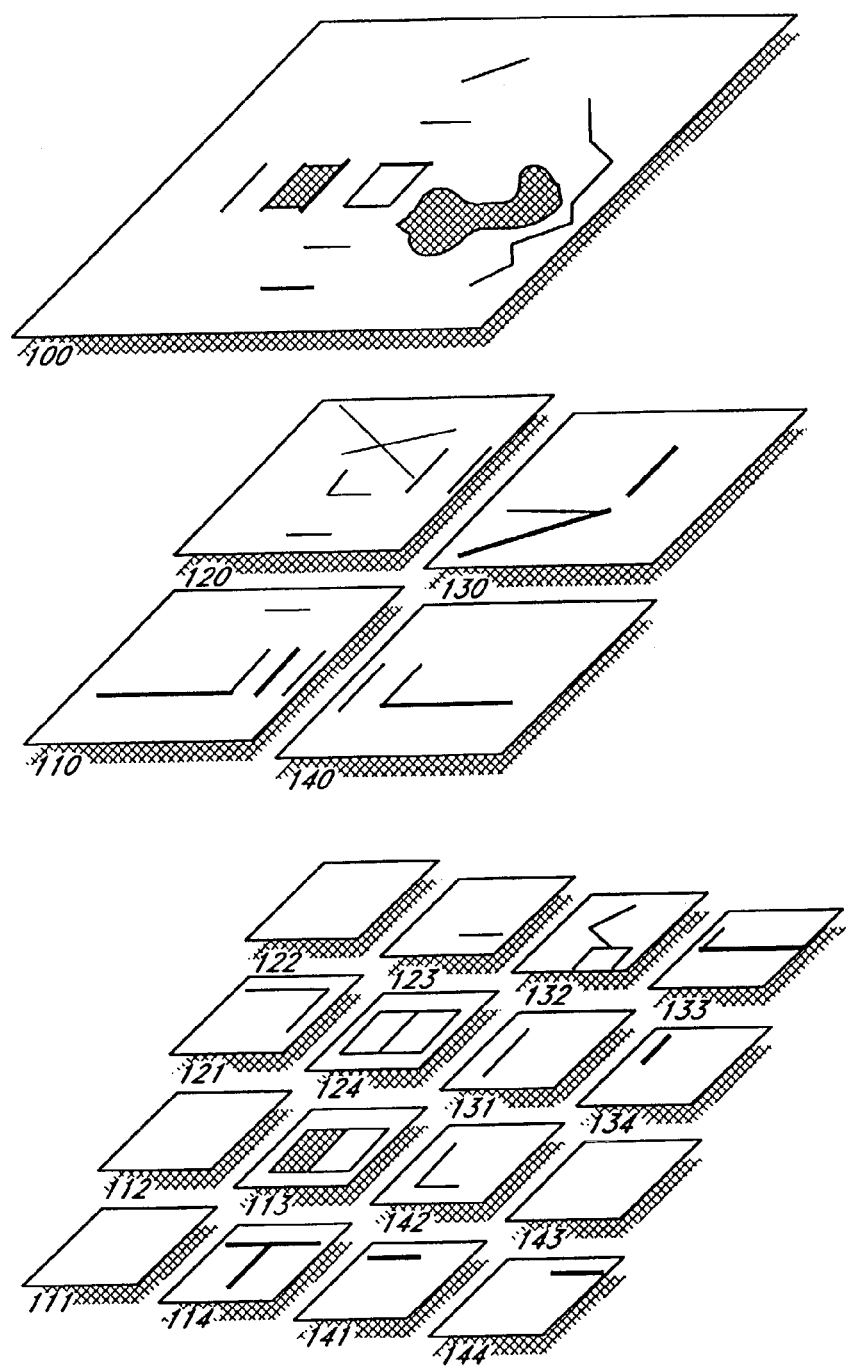
FIG. 12 is a depiction of how linear and polygonal spatial data objects fit into a two-dimensional data structure of a computer database that is organized as a Quad-Tree.

Note that in practice, the equivalent structure based on prior art shown in FIGS. 12 and 13 is seldom actually implemented. This is because the number of objects which are stuck in the upper levels is too great of a burden to allow reasonable performance. Instead, hard boundaried methods resort to alternative strategies, including fragmenting individual data objects at the tile boundaries, duplicating objects once for each tile which they touch, or indirectly referencing the objects once for each tile which they touch.

DATA TABLE 2

Figure 10:
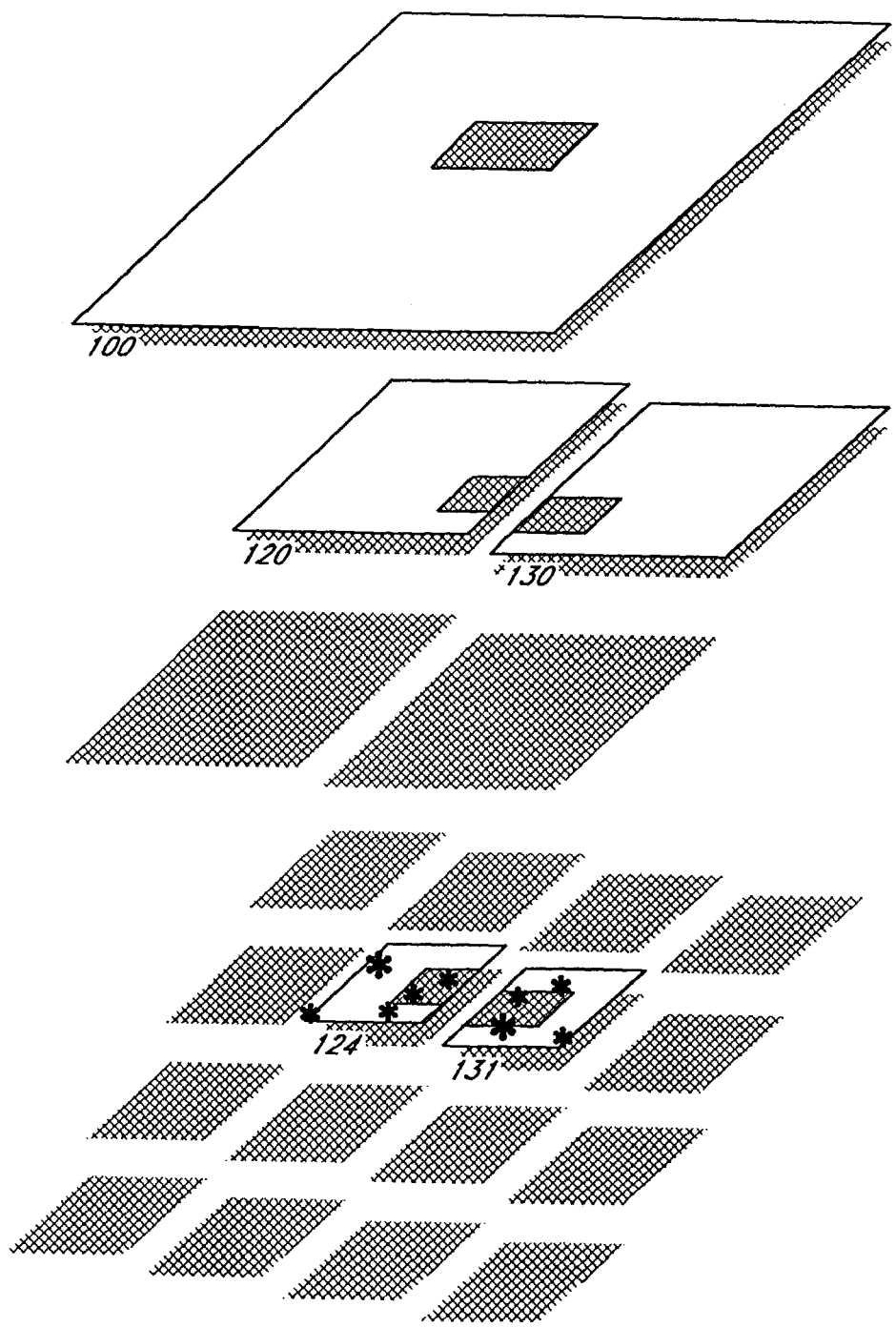
FIG. 10 is a diagram of a rectangular window retrieval applied to a Quad-Tree-based data structure of a computer database that illustrates the effectiveness of this data structure for managing two-dimensional point data.
Figure 11:
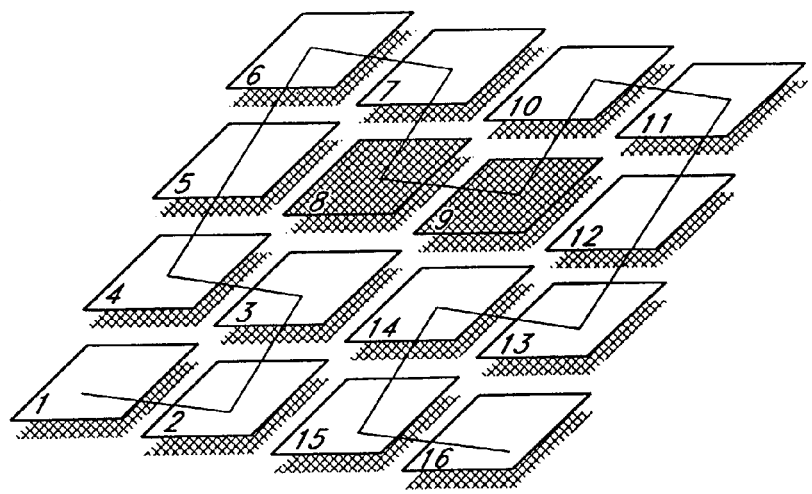
FIG. 11 is an illustration of how a computer database uses a regular, quadrant-based tiling scheme for organizing two-dimensional data by calculating the Peano-Hilbert space filling curve.
Figure 11:
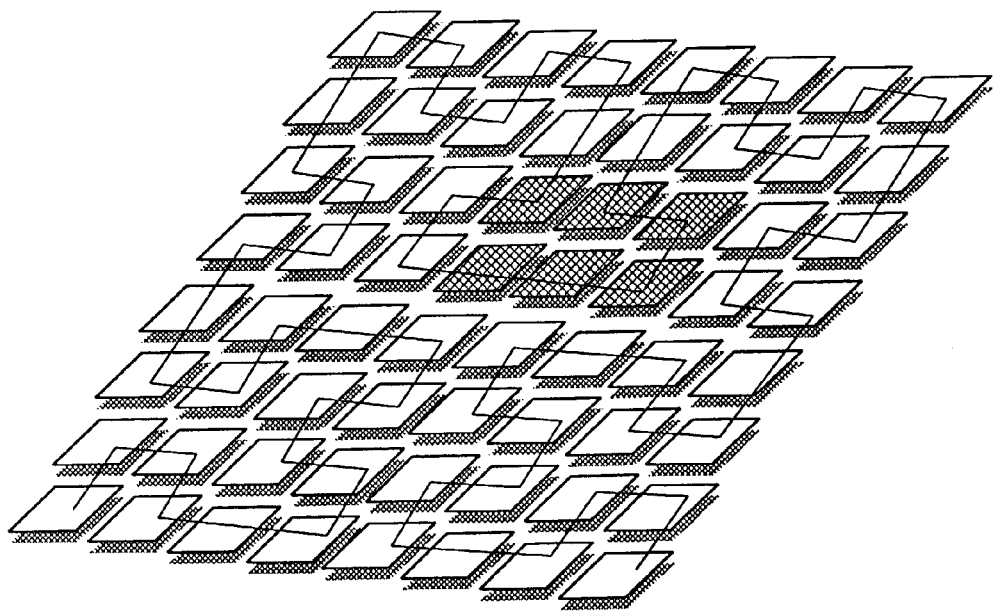

Numerical comparison of the distributions of map objects in the Tiered Shingle Structure depicted FIG. 12 the versus Quad-Tree depicted in FIG. 10.

| Level | Parts of Structure | Tiered Shgl Structure | Avg/Shingle | Quad-Tree | Avg/Node |
|---|---|---|---|---|---|
| top | 1 | 1 | 1 | 14 | 14 |
| middle | 4 | 3 | 1 | 17 | 4 |
| bottom | 16 | 60 | 4 | 33 | 2 |

2. Functional Description

The preferred embodiment of the present invention provides two principle classes of functions. The first class, Shingle Assignment Functions, convert the spatial description of a spatial data object into a "Shingle-Key". A Shingle- Key is a number which uniquely represents a specific shingle in a Tiered Shingle Structure. The second class, Query Control Functions, convert the query specification of certain common geometric queries into a list of the necessary and sufficient Shingle-Keys which "contain" the data needed to satisfy the query.

Appendix A contains a preferred embodiment of the invention written in the C programming language. There is one Shingle Assignment Function, KeyForBox (beginning on line 0507), which computes a Shingle-Key given a predetermined Minimum Bounding Rectangle and one Query Control Function Set, KeyRectCreate (line 0703), KeyRectRange (line 1030) and KeyRectDestroy (line 1125), which together compute and return of all Shingle-Keys which are needed to solve a Rectangular Window Query. The KeyForBox and KeyRectCreate function calls both expect their corresponding spatial description parameters to be expressed in Longitude (X1 and X2) and Latitude (Y1 and Y2) coordinates with decimal fractions. Those functions also both take two additional parameters: nLevelMask which controls which levels are to be included in the Tiered Shingle Structure, and nLevelLap which controls the amount of overlap between adjacent shingles. The in-line documentation included within Appendix A describes the parameter usage in greater detail.

Note that in both KeyForBox and KeyRectCreate, the double precision Longitude/Latitude coordinates are immediately translated to a fixed point integer representation, where 360 degrees of Longitude are represented in 28 bits of the integer X coordinates, and 180 degrees of Latitude are represented in 27 bits of the integer Y coordinates. The resolution of this representation is precise to roughly the nearest half-foot on the ground. This translation from double precision to fixed-point allows the use of highly efficient modular binary arithmetic for computing both shingle containment and Peano-Hilbert shingle sequencing.

For convenience, the remainder of this section is divided into the following three sub-sections: Shingle Assignment Functions, Query Control Functions and Implementation within a Conventional Database.

2.1 Shingle Assignment Functions

The Shingle-Keys generated by a Shingle Assignment Function are used to partition the members of a set of spatial data into subsets where all members of a subset have the same Shingle-Key. This means that each member of a subset can be "fit" onto the same shingle (eg: the size of the minimum bounding box that contains the object is not larger than the tile). This further means that all members of a subset have a similar spatial size and position. Indexing and clustering the data in the storage mechanism (common database management practices intended to improve efficiency) by Shingle-Key are therefore very effective, since spatial queries usually select objects which, as a group, have similar position and size.

PROCEDURE TABLE 1 shows a set of computational steps that will derive the Shingle-Key corresponding to a particular spatial data object. The steps in this table correspond to lines 0536 through 0652 of the KeyForBox function in Appendix A. The details of some of these steps are expanded upon in subsequent paragraphs.

PROCEDURE TABLE 1

Sequence of computational steps required to convert a Spatial Description into the corresponding Shingle-Key within a Tiered Shingle Structure based on regular overlapping squares or rectangles.

| | |
|---|---|
| Step 1 | Compute the Minimum Bounding Rectangle (MBR) of the Spatial Description. |
| Step 2 | Repeat Steps 3–6 for each sequential level in the structure, starting with the finest: |
| Step 3 | At the current level, determine which Shingle's minimum corner is "closest-to" but also "less-then-or-equal-to" the minimum corner of the MBR. |
| Step 4 | Determine the maximum corner of this Shingle. |
| Step 5 | If the maximum corner of this Shingle is "greater-than" the maximum corner of the MBR, then have found the smallest containing shingle. Goto Step 7. |
| Step 6 | Couldn't find smaller shingle, therefore assign object to the top-level shingle. |
| Step 7 | Determine the Shingle-Key for the current Shingle. |

Figure 4:
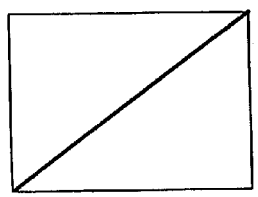
FIG. 4 is an illustration of the minimum bounding rectangles corresponding to a line segment, a polyline and a polygon in a computer database.
Figure 4:
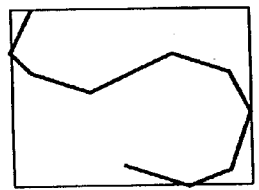
Figure 4:
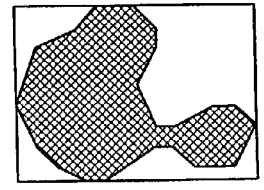
Figure 5:
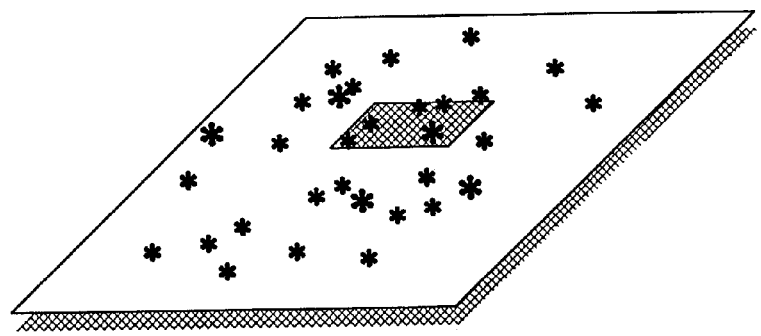
FIG. 5 is an illustration of a rectangular window retrieval on the coordinate plane of FIG. 1.
Figure 6:
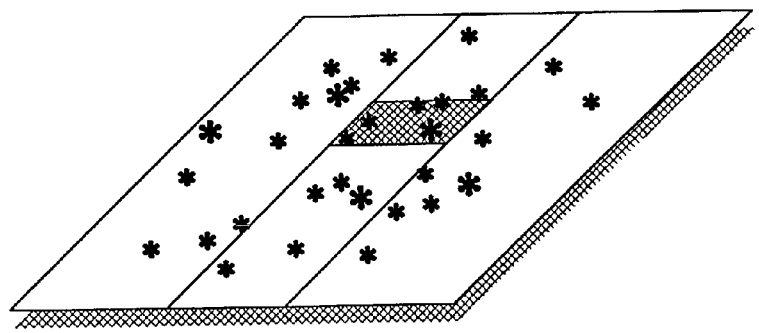
FIG. 6 is a depiction of the coordinate system of FIG. 1, wherein a conventional computer database indexing scheme has been applied to search for spatially distributed data within the coordinate plane.

Step 1 given in PROCEDURE TABLE 1 is computing the Minimum Bounding Rectangle of the Spatial Data Object. The Minimum Bounding Rectangle of a spatial data object is the smallest rectangle which is normal to the coordinate axes and completely contains the object. The typical method of representing a Minimum Bounding Rectangle is with two points: the minimum point (lower-left corner in conventional coordinate systems) and the maximum point (upper-right corner). FIG. 4 illustrates the minimum bounding rectangles of a few common types of spatial objects. PROCEDURE TABLE 2 describes how minimum bounding rectangles can be computed for a variety of common types of spatial data objects. In some cases, a slight over-estimate of the Minimum Bounding Rectangle may be used when the precise computation is too expensive.

PROCEDURE TABLE 2

Descriptions of how Minimum Bounding Rectangles can be derived for some common types of Spatial Data Objects.

| | |
|---|---|
| Point | The minimum and maximum points are the same as the Point itself. |
| Segment | The minimum point consists of the lesser x-coordinate and lesser y-coordinate of the two end points; the maximum point consists of the greater x-coordinate and greater y-coordinate of the two end points. |
| Polyline | The minimum point consists of the least x-coordinate and least y-coordinate found in the list of points for the Polyline; the maximum point consists of the greatest x-coordinate and greatest y-coordinate found in the list of points for the Polyline. |
| Polygon | The minimum point consists of the least x-coordinate and least y-coordinate found in the list of points for the Polygon; the maximum point consists of the greatest x-coordinate and greatest y-coordinate found in the list of points for the Polygon. |
| Circle | The minimum point is found by subtracting the radius of the Circle from each coordinate of the center of the Circle; the maximum point is found by adding the radius of the Circle to each coordinate of the center of the Circle |
| B-Spline | The minimum point can be estimated by selecting the least x-coordinate and least y-coordinate found in the set of four point used to construct the B-Spline; the maximum point can be estimated by selecting the greatest x-coordinate and greatest y-coordinate found in the set of four point used to construct the B-Spline. A B-spline is constructed from two end-points and two control-points. |

In Step 3 of PROCEDURE TABLE 1 a determination is made whether the Shingle in the current level who's minimum point (lower-right corner) is both closest-to and less-than-or-equal-to the Minimum Bounding Rectangle of the spatial object. If the Tiered Shingle Structure is based on a regular rectangular or square tiling of the coordinate plane (as illustrated in FIG. 14 and described in Appendix A) then the candidate shingle is the one corresponding to the tile which contains the minimum point of the Minimum Bounding Rectangle. In the KeyForBox function of Appendix A, lines 0590 and 0591, the coordinates of the minimum point of the Shingle are computed directly using binary modular arithmetic (the tile containment is implied).

In Step 4 of PROCEDURE TABLE 1, the maximum point (upper right corner) of the candidate shingle is calculated. That point can be determined directly from the minimum point of the shingle by adding the standard shingle width for the current level to the x-coordinate and adding the standard shingle height for the current level to the y-coordinate. In Appendix A, this calculation is performed in lines 0598 through 0601 of the KeyForBox function. Since the Tiered Shingle Structure used in Appendix A is based on overlapping squares, the same value is added to each coordinate.

In Step 5 of PROCEDURE TABLE 1, the maximum corner of the shingle is compared to the maximum corner of the Minimum Bounding Rectangle (MBR). This is accomplished through a piece-wise comparison of the maximum x-coordinate of the shingle to the maximum x-coordinate of the MBR and the maximum y-coordinate of the shingle to the maximum y-coordinate of the MBR. If each coordinate value of the shingle is greater than the corresponding value for the MBR, then the maximum corner of the shingle is said to be greater than the maximum corner of the MBR. In Appendix A, this calculation is performed on lines 0609 and 0610 of the KeyForBox function.

Step 6 of PROCEDURE TABLE 1 is performed if, and only if, the repeat loop of Steps 2–5 is exhausted without finding a shingle which fits the Minimum Bounding Rectangle. The spatial object which is represented by the Minimum Bounding Rectangle therefore does not fit within any of the lower levels (eg: tiers) of the shingle structure. It therefore by definition must fit within the top-level shingle. In Appendix A, this step is performed on lines 0651 and 0652 of the KeyForBox function.

Step 7 given in PROCEDURE TABLE 1 determines the Shingle-Key for the shingle which was found to "best-fit" the data object. In Appendix A, the Peano-Hilbert space filling curve is used to assign Shingle-Key numbers via the KeyGenerator function call shown in lines 0623–0625 of the KeyForBox function. The KeyGenerator function is implemented in lines 0043–0485 of Appendix A. The parameters given to the KeyGenerator function include the coordinates of the minimum point of the Shingle, and the corresponding level in the Tiered Shingle Structure. Note that the uniqueness of Shingle-Key numbers across different levels is guaranteed by the statement on line 0482 of Appendix A.

2.2 Query Control Functions

The second class of functions are used for controlling spatial queries into the computer database. Functions of this class convert the query specification for certain common geometric queries into a list of the necessary and sufficient shingle keys which contain the data needed to satisfy the query. The list of shingle-keys may be expressed either as an exhaustive list of each individual key, or as a list of key ranges (implying that all keys between and including the minimum and the maximum values of the range are needed).

The most common types of spatial queries are those which find all objects which overlap a region defined by a chosen perimeter. Examples include the Rectangular Window Query and the Polygon Overlap Query. PROCEDURE TABLE 3 shows the general usage of this type of Query Control Function.

PROCEDURE TABLE 3

Steps in the general usage of region overlap Query Control Functions.

| | |
|---|---|
| Step 1 | Identify the set of shingles which overlap the region being queried |
| Step 2 | Repeat Steps 3–5 for each identified shingle |
| Step 3 | Retrieve from the computer database the subset of spatial data which has been assigned the identified shingle-keys |
| Step 4 | Repeat Step 5 for each object in the subset |
| Step 5 | Test the object for overlap with the region being queried; Retain each object which passes the test |

For queries that overlap several regions (eg: tiles) of the database, the set of shingles which overlap the queried region is the union of the shingles from each hierarchical level which overlap the region. The shingles for a given level can be found by first identifying all the shingles which touch the perimeter of the region, and then filling in with any shingles missing from the middle section. One method of finding all the shingles which touch the perimeter of the query is to computationally trace the path of each component through the arrangement of shingles, taking care to eliminate redundant occurrences. A method of filling in the shingles missing from the middle section is to computationally scan bottom-to-top and left-to-right between the Shingles found on the perimeter.

The software program in Appendix A implements one Query Control Function Set in lines 0655–1135. This set of functions identifies all shingles which overlap the given Longitude/Latitude rectangle. PROCEDURE TABLE 4 shows the algorithmic usage of this function set.

Figure 17:
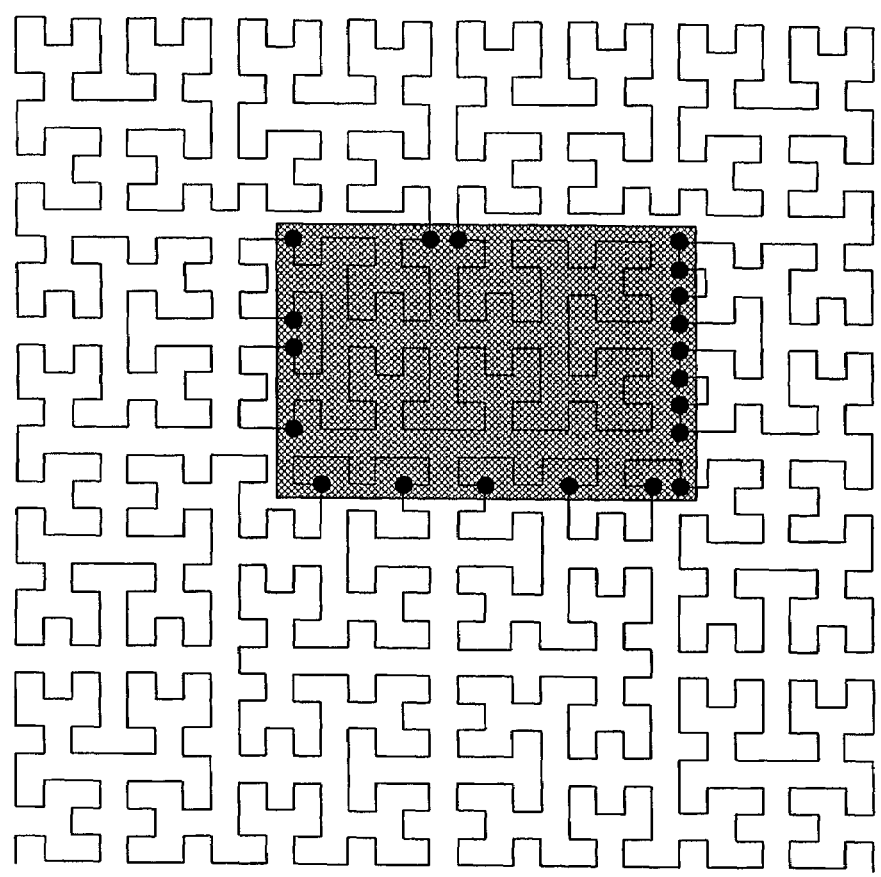
FIG. 17 is a diagram of another embodiment of a spatial data tree.

The internal function KeyRectGenerator implemented in lines 0792–1020 of the software code in Appendix A is used to compute the set of shingles for the current level. Similar to the method outlined above, this function traces through the shingles along each edge of the rectangle. However, since the Peano-Hilbert space-filling curve is used to sequence the shingles and the Peano-Hilbert curve by its nature is guaranteed to be continuous, it is sufficient to simply note whether the curve is headed into or out of the rectangle at each shingle on the edge and sort the resulting lists to find the minimum and maximum of each implied range, letting the curve fill in the middle. FIG. 17 illustrates how the Peano-Hilbert space-filling curve winds its way contiguously through each tile in one level of a spatial database.

PROCEDURE TABLE 4

Algorithmic usage of the KeyRectCreate, KeyRectRange, KeyRectDestroy function set.

| | |
|---|---|
| Step 1 | Create a KeyRect structure for the rectangle using KeyRectCreate |
| Step 2 | For each Shingle-Key range (MinKey, MaxKey) returned by KeyRectRange, repeat steps 3–5 |
| Step 3 | Select all Objects where ObjectKey ≧ MinKey and ObjectKey ≦ MaxKey |
| Step 4 | For each selected Object, repeat step 5 |
| Step 5 | If ObjectSpatialData is overlaps the rectangle, process the Object |
| Step 6 | Destroy the KeyRect structure using KeyRectDestroy |

It is possible to extend the same method to perform a general polygonal retrieval instead of a rectangular retrieval. A general polygonal retrieval is similar to a rectangular window retrieval in that the purpose of the query is to fetch all database objects which are inside or which touch the boundary of an arbitrary polygon. However, do to the limitations of the System Query Language (SQL), it is not possible to express a general polygonal query in a form equivalent to EXAMPLE QUERY 3.

To extend the algorithm of PROCEDURE TABLE 4 to perform a general polygonal query, care must be used to trace the path of the polygon though the perimeter shingles while simultaneously keeping track of which shingles correspond to entry and exit points, and which, if any are redundant. Note, however, that once the boundary shingles are identified, the same minimum and maximum range organization will work. In general, this method will work for finding all the shingles which overlap any closed region.

2.3 Implementation within a Conventional Database

DATABASE TABLE 5 illustrates a sample database table containing data objects representing a portion of the street segments from FIG. 3. The Shingle column contains the assigned Shingle-Keys from FIG. 15. The X1/Y1 and X2/Y2 columns contain the coordinates of the minimum bounding rectangle for each object within the chosen shingle.

EXAMPLE QUERY 4 shows how DATABASE TABLE 5 can be queried to find a portion of each data object with a minimum bounding rectangle that overlaps a the rectangular query window, assuming a functional interface similar to Appendix A existed for this tiered shingle structure. This query corresponds to Steps 3–5 in PROCEDURE TABLE 4. As such, this query would have to be repeated once for each key range in order to find all segments which overlap the rectangle.

As shown in FIG. 16, the key ranges which correspond to EXAMPLE QUERY 4 window are 8–9, 17–20 and 21–21. Note how running this query using these key ranges on DATABASE TABLE 5 will result in selecting the single overlaping segment assigned to Shingle 9. Other objects from FIG. 3 not listed in DATABASE TABLE 5 also overlap the window.

DATABASE TABLE 5

A conventional database table containing Street Segments. These objects correspond to the individual segments the highlighted highways HWY1 and HWY 2 in FIG. 3 as distributed into the Tiered Shingle Structure represented in FIG. 15.

| Shingle | X1 | Y1 | X2 | Y2 | StreetName |
|---|---|---|---|---|---|
| 1 | −95 | −65 | −45 | −65 | Hwy 1 |
| 2 | −45 | −65 | −25 | −65 | Hwy 1 |
| 2 | −25 | −65 | −5 | −65 | Hwy 1 |
| 2 | −5 | −65 | 10 | −65 | Hwy 1 |
| 2 | −25 | −90 | −25 | −65 | Hwy 2 |
| 2 | −25 | −65 | −25 | −40 | Hwy 2 |
| 3 | −25 | −40 | −25 | −15 | Hwy 2 |
| 3 | −25 | −15 | −25 | 10 | Hwy 2 |
| 8 | −25 | 10 | −5 | 10 | Hwy 2 |
| 8 | −5 | 10 | 10 | 10 | Hwy 2 |
| 9 | 10 | 10 | 55 | 30 | Hwy 2 |
| 11 | 55 | 75 | 95 | 75 | Hwy 2 |
| 12 | 55 | 30 | 55 | 45 | Hwy 2 |
| 15 | 10 | −65 | 25 | −65 | Hwy 1 |
| 16 | 75 | −65 | 95 | −65 | Hwy 1 |
| 19 | 55 | 45 | 55 | 75 | Hwy 2 |
| 20 | 25 | −65 | 75 | −65 | Hwy 1 |

PROCEDURE TABLE 5

Recommended Procedures for building and maintain and conventional database implementation, using functions similar to those in Appendix A.

| | | |
|---|---|---|
| Database Load | Step 1 | Prior to load: Pre-assign Shingle-Keys to records using KeyForBox function. |
| | Step 2 | Prior to load: Sort records by Shingle-Key. |
| | Step 3 | Prior to load: Include Shingle field in database table schema design. |
| | Step 4 | Bulk load records into database table. |
| | Step 5 | Create index on Shingle Field. Implement clustering, if possible |
| Record Insert | Step 1 | Prior to Insert: Compute Shingle-Key using KeyForBox on the Minimum Bounding Rectangle of the Spatial Data. |
| | Step 2 | Insert record into database, including Shingle-Key. |
| Record Update | Step 1 | Prior to Update: Compute Shingle-Key using KeyForBox on the Minimum Bounding Rectangle of the new Spatial Data. |
| | Step 2 | If new Shingle-Key is different then old Shingle-Key, include the new Shingle-Key in the update. |
| Record Delete | | For each selected Object, repeat step 5. |
| Database Unload | | Destroy the KeyRect structure using KeyRectDestroy. |

EXAMPLE QUERY 4

SQL to find all segments in a window, given a key range MinKey to MaxKey

```
select StreetName, X1, Y1, X2, Y2
   from StreetSegments
   where Shingle ≥ MinKey
   and Shingle ≤ MaxKey
   and X1 ≥ −10 and X1 ≤ 35
   and X2 ≥ −10 and X2 ≤ 35
   and Y1 ≥ 15 and Y1 ≤ 40
   and Y2 ≥ 15 and Y2 ≤ 40
```

3. Empirical Analysis

The improved partitioning identified in the earlier comparison of FIGS. 12 and 15 can be validated by measuring how the present invention behaves when given a large quantity of real map data. DATA TABLE 3 shows the results of one such measurement. The data used to perform these measurements is an extract of street segments from a U.S. Census Bureau Topographically Integrated Geographic Encoding and Referencing (TIGER) database file of Los Angeles County, Calif. Census TIGER files comprise the defacto industry standard street map data source. Los Angeles County is a good representative choice because of its large size (426367 segments in this extract) and diverse coverage (dense urbanized core, sprawling suburbia and sparsely populated mountain and desert regions).

DATA TABLE 3 compares the natural distribution of the TIGER street segments into both a Tiered Shingle Structure having a 25% overlap and an equivalent hard boundaried tiling such as that found in the prior art. These statistics were generated by feeding each segment to the KeyForBox function from the software program given in Appendix A. To generate the Shingles with 25% Overlap statistics, a value of 2 was used for the nLevelLap parameter (shingle_overlap=tile_size * $\frac{1}{2}^{nLevelLap}$)evelLap). To generate the Hard Boundaried Tiles statistics, a value of 32 was used for the nLevelLap parameter in order to force the overlap amount to zero.

In DATA TABLE 3, the Lev column indicates the level of the tile/shingle structure, 0 being the finest partitioning, 14 being the most coarse, 15 being the top-level compartment. The Size column indicates the size (both width and height) of the resulting quadrant partitioning in Latitude/Longitude degrees (=$180/2^{(15-Lev)}$). The size of the Shingles is in fact 25% larger than the value given in the Size column. Note that the software program in Appendix A implements shingles as squares in Latitudinal/Longitudinal space. The Segs column accumulates the total number of TIGER street segments which naturally fit at this level (i.e., do not cross tile/shingle boundaries—returned through the pnLevel parameter of the KeyForBox function). The Shing and Tiles columns accumulate the total number of unique Key values returned by the KeyForBox function. The Av column computes the average number of segments per unique tile/shingle. The Mx column shows the maximum number of segments which were associated with any one tile/shingle.

partitioning begins to exceed the spatial extent of LA County.) Furthermore, note how there are over 10,000 segments located at level 4 and above. If these segments were stored in a quad-Tree in this state, they would substantially clutter up the main branches of the quad-tree, substantially impeding performance. For instance, if there was a one hundred fold increase in the amount of data being stored, there would be a corresponding one hundred fold increase in the number of tile boundary crossing segments (500K at level 4,250K at level 5,125K at level 6, etc.) completely overloading the upper level branches.

The poor statistics of Hard-Tile-Boundaries columns show why Quad-Trees cannot be used to store this type of map data in this form. Instead, strategies such as data fragmentation, duplication or multiple indirect referencing have been used in the past to get around this type of problem. DATA TABLE 4 summarizes the number of objects which must be handled in one of these special case ways for the

DATA TABLE 3

A comparison of the distribution of 428367 TIGER street segments for Los Angeles County, CA. into a Hard Tile decomposition of the entire Earth's Surface, vs. the equivalent Shingle structure having 25% overlap at each level. The finest level of tiling (level 0) is 180 degrees/$2^{15}$ in each direction, or a little less than 0.4 miles North/South.

| | Size | Shingles with 25% Overlap | | | | Hard Boundaried Tiles | | | |
|---|---|---|---|---|---|---|---|---|---|
| Lev | (deg.) | Segs. | Shing | Av | Mx | Segs. | Tiles | Av | Mx |
| 15 | — | 0 | | | | 0 | | | |
| 14 | 90.0° | 0 | | | | 0 | | | |
| 13 | 45.0° | 0 | | | | 0 | | | |
| 12 | 22.5° | 0 | | | | 89 | 1 | 89 | 89 |
| 11 | 11.3° | 0 | | | | 440 | 2 | 220 | 439 |
| 10 | 5.63° | 0 | | | | 0 | | | |
| 9 | 2.82° | 0 | | | | 0 | | | |
| 8 | 1.41° | 0 | | | | 131 | 2 | 65 | 98 |
| 7 | 0.704° | 0 | | | | 1038 | 8 | 120 | 549 |
| 6 | 0.352° | 0 | | | | 1366 | 16 | 85 | 460 |
| 5 | 0.176° | 2 | 2 | 1 | 1 | 2919 | 49 | 60 | 281 |
| 4 | 0.088° | 33 | 21 | 2 | 5 | 5866 | 157 | 37 | 175 |
| 3 | 0.044° | 380 | 160 | 2 | 15 | 11642 | 557 | 21 | 98 |
| 2 | 0.022° | 2507 | 888 | 3 | 12 | 22415 | 1885 | 12 | 57 |
| 1 | 0.011° | 14859 | 3833 | 4 | 26 | 41848 | 5781 | 7 | 41 |
| 0 | .0055° | 410586 | 19792 | 21 | 255 | 340613 | 18875 | 18 | 245 |

The Shingles-with-25%-Overlap columns in DATA TABLE 3 shows how efficiently the tiered shingle structure organizes this set of data. Note the shallow distribution of segments into the lower levels of the structure: over 95% of the segments have settled into the lowest level of the data structure. Note how few additional levels are needed, and also the low average and maximum number of segments per shingle in those levels.

Now contrast the Shingles-with-25%-Overlap statistics with the corresponding Hard-Tile-Boundaries statistics in DATA TABLE 3. This serves as a rough model for how a Quad-Tree data structure would behave under this load of street segment data (the correspondence is not precise, however, do to the structural dependency on storage space per Quad-Tree node). Observe the overall trend which increases the fraction of segments cut by the new boundaries introduced at each finer level. Specifically, for levels 6 down through 1, Segs doubles with each step down in level. This doubling occurs because each finer level doubles the total length of the hard tile boundaries, therefore doubling the likelihood that a given segment will cross one (note that the trend fades above level 6 because the granularity of the various tile sizes. The statistics in that table clearly show the trade-off between minimizing the number of segments per tile, versus limiting the number of segments which must be managed though a special case.

DATA TABLE 4

For the same set of 428367 TIGER street segments, the accumulated number of segments which cross boundaries between tiles.

| Tile Size (degrees) | Est. Segs/Tile | Crossing Segs. | % of Total |
|---|---|---|---|
| 0.0055° | 25 | 87754 | 20.5 |
| 0.011° | 95 | 45906 | 10.7 |
| 0.022° | 180 | 23491 | 5.5 |
| 0.044° | 350 | 11849 | 2.8 |
| 0.088° | 640 | 5983 | 1.4 |
| 0.176° | 1250 | 3064 | 0.7 |

4. Mathematical Analysis

The statistical trends identified in the Empirical Analysis result in very predictable logarithmic cost for spatial retrieval which can be seen through FORMULAS 7 and 8.

These formulas are based on the assumption that a regular database table/index is used as the storage/retrieval mechanism for the spatial data, where the index is based on Shingle-Keys. FORMULA 7 is derived from FORMULA 4 which established the behavior of a tile-based method for storing points in a database table. The primary refinement in FORMULA 7 is that a sum must be accumulated to account for the spread of objects across multiple levels. FORMULA 11 is derived from FORMULA 5, primarily by changing the offset factor from 1 to 2 to account for the fact that the overlap will tend to increase the number of tiles touched by the query window. TABLE 13 shows the plug-in values for $A_L$ and $B_L$ for a 0.016° Longitude×0.0145° Latitude rectangular window (a roughly 1 mile square at Los Angeles, Calif.'s Latitude).

The modest size of the values which appear in TABLE 13 compared to the huge population size is the factor which allows the O(log(N)) performance behavior. For instance, if the entire set of TIGER files for all US Counties were to be used instead of only LA County, the roughly hundred fold increase in population size should only increase by two the logarithmic component of FORMULA 7 (log10(400,000)=6.6; log10(40,000,000)=8.6). All other components of the formula would stay roughly the same. Furthermore, if the rectangular window retrieval size should dramatically change, causing the behavior to become unbalanced, the shingle size can be adjusted up or down to compensate. The software program given in Appendix A was tuned for handling highly detailed street map data.

Figure 8:
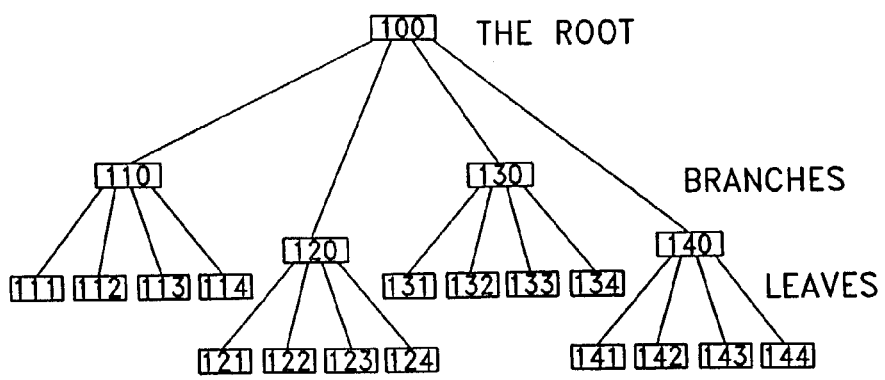
FIG. 8 is a diagram of a tree that depicts how the quadrants and sub quadrants of the coordinate plane decomposition of FIG. 7 can be organized to form a Quad Tree-type spatial data structure for a computer database.
Figure 9:
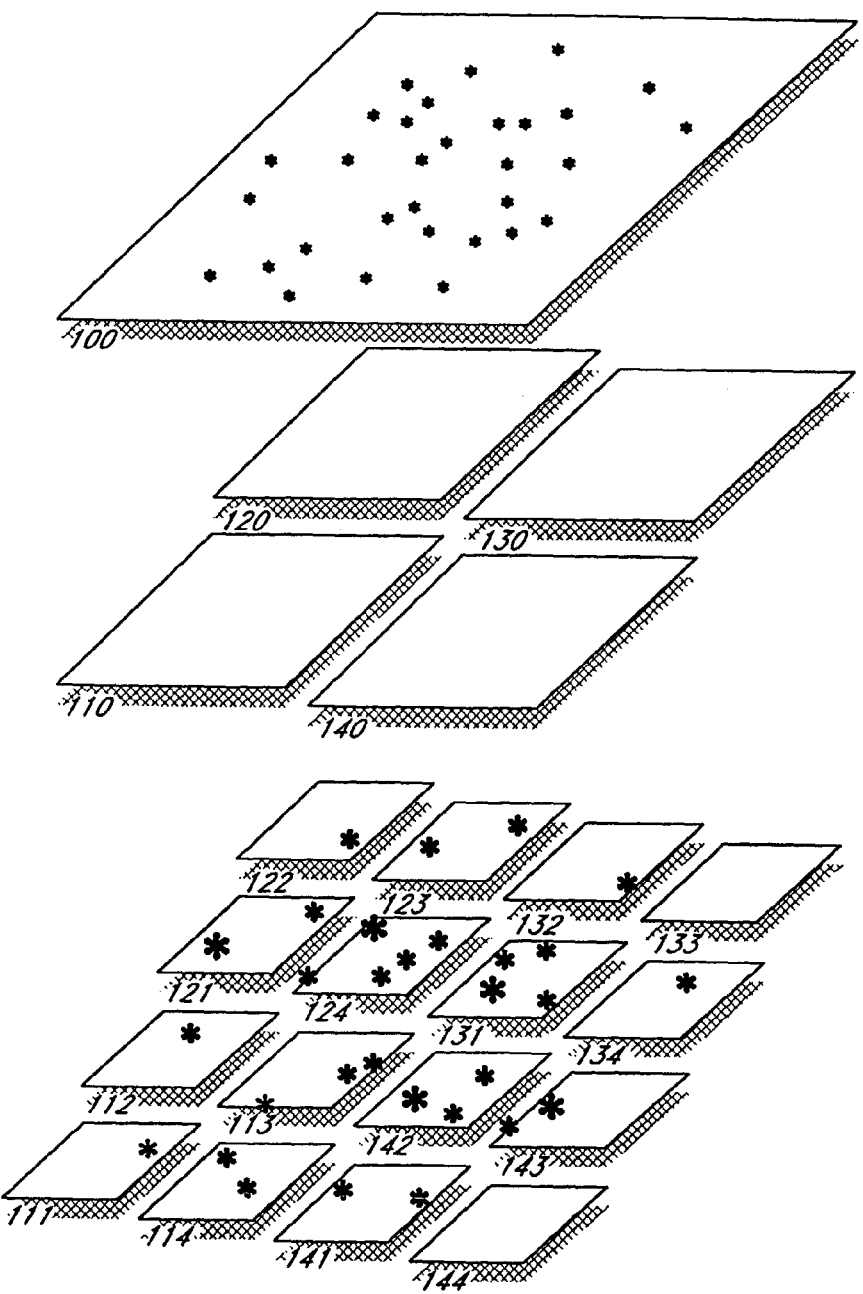
FIG. 9 is an illustration of a distribution of point data objects into Quad-Tree nodes in a spatial data structure of a computer database.

Note that FORMULA 7 represents a worst case which can be greatly improved in practice. Specifically, the value of $A_L$ in the portion of the formula $A_L \times \log(N)$ can substantially be reduced by using the Peano-Hilbert space filling curve to sequence the shingles as they are stored in the computer database, as is done in the software implementation given in Appendix A. Use of that curve guarantees that many adjacent shingles will be numbered consecutively. For instance, in any arbitrary 3×3 grouping of adjacent shingles in a field sequenced with the Peano-Hilbert curve, there can be at most 4 consecutive sequences (refer to FIGS. 8 and 17).

FORMULA 7

Expected cost of window retrieval using the shingle numbers of the invention in a database table.

$$O(\Sigma(A_L \times (\log(N) + K \times B_L)))$$
where
$A_L$ = expected number of tiles needed to satisfy the query at each level,
$B_L$ = expected number of objects assigned to each tile at each level.

FORMULA 8

Expected number of shingles per retrieval by level.

$$A_L = \text{round\_up}(W_X / T_{XL} + 2) \times \text{round\_up}(W_Y / T_{YL} + 2)$$
where
$W_X$ = width of the rectangle,
$T_{XL}$ = width of shingle for level, FORMULA 8-continued Expected number of shingles per retrieval by level.

$W_Y$ = height of the rectangle,
$T_{YL}$ = height of shingle for level.

TABLE 13

Computed values for $A_L$ for an arbitrary 1 square mile rectangular window around Los Angeles County, CA. Measure values for $B_L$ mile from TABLE 7.

| Level | $A_L$ | $B_L$ - Avg | $B_L$ - Max |
|---|---|---|---|
| 0 | 5 × 5 = 25 | 21 | 255 |
| 1 | 4 × 4 = 16 | 4 | 26 |
| 2 | 3 × 3 = 9 | 3 | 12 |
| 3 | 3 × 3 = 9 | 2 | 15 |
| 4 | 3 × 3 = 9 | 2 | 5 |
| 5 | 3 × 3 = 9 | 1 | 1 |

5. Conclusion

The present invention provides an efficient method and system for organizing large quantities of data. As discussed above, databases of information can comprise hundreds of megabytes of data, thereby being very difficult to efficiently search. However, multidimensional data that is stored with the method and system of the present invention can be retrieved with far fewer processor cycles and disk seeks than in prior systems.

By separating the larger coordinate system into sub-regions, each spatial object is assigned to a particular sub-region. These sub-regions are known as tiles because they resemble a series of tiles once superimposed over a set of spatial data. Each tile would, therefore, hold a particular set of spatial data. Thus, a user that knew which tiles held the desired information only needed to search those specific tiles. Once the computer user identifies spatial data located in a desired region of the spatial database, the system can read those few tiles from memory and begin the process of gathering objects from those tiles. This method thereby prevents the system from analyzing every object in the entire database for every computer user's request.

The present invention provides a series of overlaps between every tile in a spatial database. These overlapping tiles, termed herein "shingles", represent tiles that overlap their nearest neighbors. The area of overlap for any shingle is pre-determined to provide the maximum efficiency. The shingle overlap allows more data objects in the spatial database to be assigned to only one shingle and not split between multiple hard edged tiles, as was done in prior systems. As discussed above, dividing an object across multiple tiles is very disadvantageous because it requires the system to track every tile that is assigned to a particular object.

The system and method of the present invention alleviates the problem of small objects which cross title boundaries being moved to higher levels. In the present invention, as the layers of sub-regions are generated, they are calculated to have areas of overlap. The present invention improves the efficiency of individual databases because the shingle overlap size in each layer can be programmed to provide the fastest access to the spatial database.

A database with numerous small objects, such as streets, can be programmed with a smaller shingle size than databases that have numerous large objects, such as freeways. Tailoring the size of the tiles and shingles to the size of the average data object keeps more data objects at a single, lower level within the database architecture of the present invention. Thus, any data object that cannot fit within a single shingle can be stored in the next higher level of shingling.

What is claimed is:

1. A method of partitioning a map database, the method comprising:
creating a top level region defining a geographic area of a map and comprising substantially all of the objects in the map database;
creating a first sub-region comprising a first subset of objects contained in the top level region; and
creating a second sub-region comprising a second subset of objects contained in the top level region and a subset of objects contained in the first sub-region.

2. The method of claim 1, wherein creating the first sub-region comprises creating a first geographic sub-region of the top level region.

3. The method of claim 1, wherein creating the second sub-region comprises creating a second geographic sub-region having an overlapping region common to both the first and second sub-regions.

4. The method at claim 3, wherein the overlapping region comprises about 25% of an area of the first sub region.

5. A method of searching a man database, the method comprising:
receiving a query of the man database, the anew defining a search space having a perimeter, the perimeter defining a polygonal window;
determining a set of overlapping regions in a first hierarchical level that contain at least a portion of the perimeter, the set of overlapping regions defining a boundary; and determining additional overlapping regions in the first hierarchical level that are contained within the boundary.

6. The method of claim 5, further comprising eliminating a fist region from the set of overlapping regions for which the portion of the perimeter contained within the first region is wholly contained within a section of the first region overlapping a second region.

7. The method of claim 5, wherein determining the set of overlapping regions in the first hierarchical level comprises:
tracing a pat along the perimeter,
determining each region through which the path intersects; and
eliminating redundant occurrences of regions.

8. The method of claim 5, wherein determining additional overlapping regions in the first hierarchical level comprises:
determining a region at a boundary minimum along a first row of the set of overlapping regions defining the boundary;
determining a region at a boundary maximum along the first row of the set of overlapping regions defining the boundary; and
determining overlapping regions between the region at the boundary minimum and the region at the boundary maximum.

9. The method of claim 5, wherein determining additional overlapping regions in the first hierarchical level comprises. determining the additional overlapping regions using a Peano-Hilbert curve.

10. The method of claim 5, further comprising determining a set of overlapping regions in a second hierarchical level that contain at least a portion of the perimeter.

11. The method of claim 5, wherein the perimeter defines a rectangular window.

12. A method of searching a map database, the method comprising:
receiving a query;
determining a first set of overlapping regions in a lowest level of a tiered structure based at least in part on the query, wherein the tiered structure comprises a map database and each region in the tiered structure defines a geographic area; and
determining a second set of overlapping regions in an upper level of the tiered structure based at least in part on the query, each region in the upper level of the tiered structure comprising a plurality of regions from the lowest level of the tiered structure.

13. The method of claim 12, wherein at least one region within the tiered structure contains an object from a map database having an area wholly contained within an area defined by the region.

14. The method of claim 12, wherein at least one upper level region within the tiered structure contains an object from a map database having a dimension larger than a dimension of the region from the lowest level.

15. A method of searching a tiered database of geographic information, the method comprising:
generating a query for an area or an object within the tiered database;
receiving a first set of regions from a lowest level of a the tiered database, the tiered map database comprising overlapping regions and the first set of regions based at least in part on the query; and
receiving a second set of regions from an upper level of the tiered database based at least in part on the query, each region in the upper level of the tiered database comprising a plurality of regions from the lowest level of the tiered database.

16. The method of claim 15, wherein the first set of regions from the lowest level of the tiered database define at least one object from the database, each of the at least one object having an area smaller than an area of the lowest level region.

17. The method of claim 15, wherein each region in a level of the tiered database overlaps an adjacent region.

18. The method of claim 15, wherein each region in a level of the tiered database overlaps an adjacent region by about 25% of an area defined by the adjacent region.

19. The method of claim 15, wherein at least one region in the first set of regions from the lowest level of the tiered database comprises street segment objects from a street map database.

20. An electronic map, comprising:
a memory configured to store a map database configured as multiple tiers, each tier lower than a top level tier comprising overlapping regions;
a processor configured to receive a query and, based in part on the query, further configured to determine a first set of overlapping regions in a lowest tier of the map database; and
a monitor configured to display a map segment comprising objects from the first set of overlapping regions.

21. The electronic map of claim 20, wherein the processor is further configured to determine at least one overlapping region in a tier higher than the lowest tier of the map database, the map segment further comprising at least one object from the tier higher than the lowest tier.

22. The electronic map of claim 20, wherein the memory comprises a disk.

23. The electronic map of claim 20, wherein the query comprises a query for a region within the map database.

24. The electronic map of claim 20, wherein the query comprises a query for an object stored within a region in one tier of the map database.

25. The electronic map of claim 20, wherein the query comprises a query for a window from the map database.

26. One or more processor readable storage devices having processor readable code embodied thereon, the processor readable code for programming one or more processors to perform a method of searching a database, the method comprising:

receiving a query;

determining a first set of overlapping regions in a lowest level of a tiered structure based at least in part on the query, wherein the tiered structure comprises a map database and each region in the tiered structure defines a geographic area; and determining a second set of overlapping regions in an upper level of the tiered structure based at least in part on the query, each region in the upper level of the tiered structure comprising a plurality of regions from the lowest level of the tiered structure.

* * * * *